US007139735B2

(12) United States Patent
Ohno et al.

(10) Patent No.: US 7,139,735 B2
(45) Date of Patent: Nov. 21, 2006

(54) ADMINISTRATION PLANNING SYSTEM

(75) Inventors: Hiroaki Ohno, Tokyo (JP); Kenji Hirai, Tokyo (JP); Isao Shiromaru, Hiroshima (JP)

(73) Assignees: Mitsubishi Denki Kabushiki Kaisha, Tokyo (JP); Chugoku Electric Power Co., Inc., Hiroshima (JP)

( * ) Notice: Subject to any disclaimer, the term of this patent is extended or adjusted under 35 U.S.C. 154(b) by 145 days.

(21) Appl. No.: 10/407,906

(22) Filed: Apr. 7, 2003

(65) Prior Publication Data
US 2003/0225664 A1 Dec. 4, 2003

(30) Foreign Application Priority Data
Jun. 3, 2002 (JP) ............................ P2002-161777

(51) Int. Cl.
*G06Q 40/00* (2006.01)
(52) U.S. Cl. ..................................................... 705/38
(58) Field of Classification Search .................. 705/7, 705/8, 38
See application file for complete search history.

(56) References Cited

U.S. PATENT DOCUMENTS

| 5,974,395 A | 10/1999 | Bellini et al. |
| 6,021,402 A * | 2/2000 | Takriti .......................... 705/412 |
| 6,122,623 A | 9/2000 | Garman |
| 6,477,660 B1 * | 11/2002 | Sohner ............................ 714/1 |
| 6,876,992 B1 * | 4/2005 | Sullivan ......................... 706/47 |
| 2002/0116374 A1 * | 8/2002 | Bette et al. ..................... 707/3 |
| 2003/0225606 A1 * | 12/2003 | Raghuraman et al. ......... 705/7 |
| 2004/0039622 A1 * | 2/2004 | Masiello et al. ............... 705/8 |
| 2004/0107182 A1 * | 6/2004 | Yoshida ......................... 707/1 |
| 2004/0158772 A1 * | 8/2004 | Pan et al. ....................... 714/14 |
| 2005/0131729 A1 * | 6/2005 | Melby et al. ................... 705/1 |

FOREIGN PATENT DOCUMENTS

| JP | 2001-255925 | 9/2001 |
| JP | WO 03/091922 A1 * | 11/2003 |
| KR | 2000-0058988 | 10/2000 |

OTHER PUBLICATIONS

Datta et al, Developing a Risk Management Matrix for Effective Project Planning—An Emprical Study, Jun. 2001, Project Management Institute, vol. 32, No. 2, pp. 45-57.*
Fogel et al, Improve Output through Reliability-Based Maintenance, Feb. 1997, Packaging Technology & Engineering, p. 22.*

* cited by examiner

*Primary Examiner*—Hani M. Kazimi
*Assistant Examiner*—James M. Alpert
(74) *Attorney, Agent, or Firm*—Leydig, Voit & Mayer, Ltd.

(57) ABSTRACT

A system for preparing an administration plan using a computer, includes an inputting function, a risk calculating function, an optimizing function, and an outputting function. The optimizing function prepares the administration plan by optimizing and adjusting distribution between investment levels in investment items and the risk levels for a planning term.

15 Claims, 25 Drawing Sheets

FIG. 2

| INVESTMENT ITEMS | JUL. | AUG. | SEP. | OCT. | NOV. | DEC. |
|---|---|---|---|---|---|---|
| FACILITY A | | | | | | |
| FACILITY B | | | | | | |
| FACILITY C | | | | | | |

201 → PLAN TERMS
202 → (Investment Items column)

FIG. 3

| INVESTMENT ITEMS | PLAN TERMS | | | | | | INVESTMENT SUM | | RISK SUM | |
|---|---|---|---|---|---|---|---|---|---|---|
| | JUL. | AUG. | SEP. | OCT. | NOV. | | | | | |
| FACILITY A | DAILY MAINTENANCE LEVEL A | | INSPECTION: LEVEL A (302) | DAILY MAINTENANCE LEVEL B | | IA1 | IA2 | IA | RA1 | RA2 | RA |
| FACILITY B | DAILY MAINTENANCE LEVEL A | | | DAILY MAINTENANCE LEVEL C | INSPECTION: LEVEL A | IB1 | IB2 | IB | RB1 | RB2 | RB |
| FACILITY C | | DAILY MAINTENANCE LEVEL B | | INSPECTION: LEVEL B | DAILY MAINTENANCE LEVEL C | IC1 | IC2 | IC | RC1 | RC2 | RC |

301, 302

RISK PERCENTAGE 1001

| FACILITY SYMBOL | FACILITY KIND | PERIOD TILL RISK | RISK COUNTERMEASURES |
|---|---|---|---|
| F0001 | MOTOR | 10726 | REPLACE |
| .......... | | | |
| F0010 | VALVE | 10904 | REPAIR |
| .......... | | | |
| F0100 | MOTOR | 10921 | REPLACE |
| .......... | | | |
| | | | |

$y = \alpha x + \beta'$

FIG. 18

| INVESTMENT ITEMS | INVESTMENT EVALUATION COEFFICIENT | RISK EVALUATION COEFFICIENT |
|---|---|---|
| FACILITY A | 1.0 | 1.0 |
| .......... | | |
| FACILITY B | 1.0 | 2.0 |
| .......... | | |
| FACILITY C | 1.5 | 1.0 |
| .......... | | |
| | | |

FIG. 20

| CASE NUMBER | PLAN TERMS | INVESTMENT ITEMS 1 - N | RISK CALCULATING FORMULA KINDS | INVESTMENT ASSIGNMENT RESULT | LOSS ASSIGNMENT RESULT |
|---|---|---|---|---|---|
| CASE 1 | 00/04/01 - 01/09/30 | FACILITIES A, B, C | WEIBULL DISTRIBUTION | IA1, IA2, ... | RA1, RA2, ... |
| ......... | | FUELS A, B, C | | | |
| CASE 2 | 99/04/01 - 01/03/31 | | | | |
| ......... | | | | | |
| CASE 3 | 98/04/01 - 01/03/31 | OPERATORS A, B, C | | | |
| ......... | | | | | |

| INVESTMENT LEVEL | INVESTMENT | RISK RISE |
|---|---|---|
| LEVEL 1 (LOW) | IA1 | 0.3% |
| LEVEL 2 (MEDIUM) | IA2 | 0.2% |
| LEVEL 3 (HIGH) | IA3 | 0.1% |

| INVESTMENT LEVEL | INVESTMENT | RISK FALL |
|---|---|---|
| LEVEL 1 (LOW) | IB1 | 0.1% |
| LEVEL 2 (MEDIUM) | IB2 | 0.2% |
| LEVEL 3 (HIGH) | IB3 | 0.3% |

ADMINISTRATION PLANNING SYSTEM

BACKGROUND OF THE INVENTION

1. Field of the Invention

This invention relates to a method for optimizing an administration plan of an enterprise by evaluating investments in various resources such as facilities, man power, and material from the viewpoint of effect-on-investment and, more particularly, to a system for optimizing the administration plan containing risk costs, as caused by suppressing investment cost as the standard of evaluating of the effect-an-investment.

2. Description of the Related Art

In the method of making the administration plan of an enterprise, as represented by the supply chain management system, there is known a system for making an assignment plan to maximize the entire profits on the items such as the throughput of products, the procurement of materials, the running scheme of facilities or the arrangement of talents by predicting the future demands. In the supply chain management, the target throughput is achieved within a designated period to maximize the profits by optimizing the amounts of resources needed at the individual manufacture steps till the products are shipped, under the constraining conditions of the processing abilities (of facilities and operators) of the individual steps and the throughputs (of materials or intermediates). One example of the supply chain management is described in JP-A-10-97574.

The administration planning system of the related art such as the supply chain management is a system for determining an optimum distribution method for achieving a given target with finite resources (e.g., facilities, operators or materials). If the qualities of resources to be assigned are at a predetermined standard or higher, the efficiency of the administration can be expected by using the optimum plan obtained. However, no consideration is given to the risk factors (e.g., troubles of facilities, the skills of operators or the defects of materials) of the resources to be assigned. For the expenses for mantaining the qualities of the resources to be assigned, therefore, plans for expense assignment (e.g., the cost for inspections and maintenance or the cost for education and training) have to be made individually on the basis of the results of the preceding year. In other words, the production plan and the planning work to run the resources for production are so independent as to make it difficult to prepare the optimum administration plan for the entire enterprise activities.

SUMMARY OF THE INVENTION

This invention has been conceived to solve the above-specified problems and has an object to make it possible not only to optimize the distribution of investment costs as in the related art but also to make an optimum administration plan including the risk cost, as might otherwise occur due to the reduction in the investment, by considering the risk factors determined for every kind to be invested.

According to this invention, an administration planning system for making an administration plan by a computer is proposed. The administration planning system includes an inputting function, a risk calculating function, an optimizing function and an outputting function. The inputting function inputs a planning term and plural investment items and inputs investment levels to each of the investment items. The risk calculating function calculates risk levels on the basis of a correlation between the investment level to each of the investment items and a risk percentage corresponds to its investment level. The optimizing function makes the administration plan including an optimized investment levels and an optimized risk levels by optimizing and adjusting the distribution between the investment levels to the investment items and the risk levels calculated by said risk calculating function for the planning term. The outputting function outputs the optimized investment level and the optimized risk level for each of the investment items on the basis of the administration plan made by the optimizing function.

According to the administration planning system of this invention, the effect-to-cost evaluations on the basis of the investment level and the risk percentage can be made in the conventional administration planning work which has been done on the past experiences, thereby to provide an effect that the administration plan can be optimized.

The first additional feature is that each of the investment items is divided into an upper hierarchy and a lower hierarchy. The optimizing function makes the administration plan have an upper administration plan, including upper optimized investment levels and upper optimized failure risk levels corresponding to each of the upper hierarchies, and a lower administration plan including lower optimized investment levels and lower optimized failure risk levels corresponding to each lower hierarchies. The upper administration plan is used as a constraining condition in the optimizing function for making the lower administration plan.

According to this first additional feature, in case an administration plan is made over a plurality of planning branches in an enterprise, the entire administration plan can be divided into ones for individual charge branches, thereby to optimize the administration plan.

The second additional feature is that each of the investment items is divided into an upper hierarchy and a lower hierarchy. The failure risk percentage in the investment items of the upper hierarchy is calculated by using the failure risk percentage in its lower hierarchy.

According to this second additional feature, even in the case where the risk percentage of the investment is determined by the relation between a plurality of risk factors, the entire risk percentage can be calculated by providing the risk percentage calculating unit, thereby to provide an effect that the optimizations can be achieved by using the entire risk percentage in the upper administration plan and the individual risk percentages in the lower administration plan.

The third additional feature is that the construction of the upper hierarchy and the lower hierarchy of each of the investment items in each of the upper and lower hierarchies is represented as a block diagram and outputted from the outputting function.

According to this third additional feature, even in the case of a large number of risk factors necessary for calculating the risk percentages of the investment items, the relations between the risk factors can be hierarchically defined by providing the editing function of the risk factor analysis diagram, thereby to provide an effect that the calculating procedure of the risk percentages is clarified.

The fourth additional feature is that the individual data of the past investment level and the risk percentage corresponding to each of the investment items are inputted from the inputting function, and the correlation between the past investment level and the past risk percentage is calculated by a statistical method.

According to this fourth additional feature, the risk percentage data can be automatically set on the basis of the real data so that the works to adjust the necessary risk percentages need not be done for every investment item, thereby to provide an effect that the precision in the administration plan can be improved.

The fifth additional feature is that the distribution of the investment levels and the failure risk levels is optimized and adjusted to make the administration plan by constraining at least one of the investment levels and the failure risk levels arbitrarily.

According to this fifth additional feature, there are obtained effects that the administration plan can be made under the various cost constraints, and that the influences of the constraining conditions on the administration plan can be confirmed.

The sixth additional feature is that the administration plan is made by weighting at least one of the investment levels and the failure risk levels for each of the investment items and by optimizing and adjusting the distribution of the investment levels and the failure risk levels by the designated weighting.

According to this sixth additional feature, the setting of the evaluation function formula to be used in the optimum solution research can be altered with the convenient means thereby to provide an effect that the administration plan reflecting the difference of importance on the individual investment items can be made.

The seventh additional feature further includes retrieving function to retrieve a past administration plan example similar to the designated combination of the investment items and the planning term, and the administration plan is made by bringing the distribution between the investment levels and the failure risk levels of the administration plan example into an initial state and by optimizing and adjusting the combination of the distribution between the investment levels and the failure risk levels from the initial state.

According to this seventh additional feature, there is obtained an effect that the validity of the administration plan being made can be confirmed by comparing it with the past similar examples.

The eight additional feature is that, the calculating procedure for optimizing the distribution between the investment levels and of the failure risk levels is outputted by the outputting function.

According to this eighth additional feature, there are obtained effects that the search of the optimum solution efficiently can be executed within the limited time period and that the validity of the solution obtained can be confirmed.

The ninth additional feature is that the correlation between the investment level and the failure risk level is diagrammed and outputted by the outputting function.

According to this ninth additional feature, the result of the administration plan made under a plurality of conditions can be presented to provide an effect that the tendency of the effect-to-cost can be intuitively grasped.

The tenth additional feature further includes: acquiring data at a predetermined period from a data managing system and for storing at least the data of the failure risk percentage; extracting the administration plan, which has to be re-calculated, automatically in case the failure risk percentage data are altered; a function to execute the making of the optimum administration plan on the basis of the value of the failure risk percentage data altered with respect to the extracted administration plan; and providing a detailed cost management system for calculating the investment costs when a total expense is given, with automatically altered data in case the investment obtained as the optimum solution of the administration plan is altered.

According to this tenth additional feature, there are obtained effects that the stored data can be reflected at a proper timing on the risk percentage calculations, and that the reliability of the entire system can be improved as the data storage increases.

The eleventh additional feature further includes a result index calculating function to calculate a business index data for the planning term depending on at least market prediction data constructed of business income, business expense, and the investment levels of the administration plan made by the optimizing function.

According to this eleventh additional feature, the administration plan made can be evaluated not only from the viewpoint of the investment effect but also in relation to the various cash flows in the enterprise administration, thereby to provide an effect that the administration plan can be made in flexible response to the changes in the enterprise result and the market.

The twelfth additional feature is that first investment levels, defining a relationship of a rise of the failure risk percentage for the continuation of each of investments, and a second investment levels, defining a relationship to a fall of the failure risk percentage, before and after each of investments are inputted, to each of investment items, and optimized combination levels are calculated to minimize the sum of the investment sum and the failure risk sum for the planning term, from the combinations of the first investment level and the second investment level.

According to this twelfth additional feature, the rising and falling patterns of the risk percentage can be evaluated in various combinations of investments thereby to provide an effect that the precision in the administration plan can be improved.

The thirteenth additional feature includes calculating an expense against a constraint on the basis of a difference from an upper limit and a lower limit determined by the constraint, in case at least one of the constraint to the investment level and the constraint to the failure risk level is not satisfied.

According to this thirteenth additional feature, even in case the total number of combinations of the investments to be handled in the administration plan and the constraining conditions increase, the optimum solution can be efficiently searched. Even in the case of the same number of violating constraining conditions, moreover, the superiority of the combination of the individual investments can be judged from the difference in the expense for the violation of the constraint, thereby to provide effects to improve the precision in the administration plan and to shorten the making time.

The fourteenth additional feature includes calculating the combination of investment levels for minimizing the total expense, by using the taboo searching method.

According to this fourteenth additional feature, even in case the sum of combinations for investments to be treated in the administration plan increases so exponentially that all the combinations cannot be evaluated within a designated period, therefore, the search range containing the combination having a good evaluation (or a small total expense) can be evaluated in a concentrated manner, thereby to provide effects to improve the precision in the administration plan and to shorten the making time.

BRIEF DESCRIPTION OF THE DRAWINGS

FIG. 2 is a diagram showing one example of planning term data and investment items in Embodiment 1 of this invention;

FIG. 3 is a diagram showing one example of administration planning data in Embodiment 1 of this invention;

FIG. 18 is a diagram showing one example of weighting definition data in Embodiment 7 of this invention;

FIG. 20 is a diagram showing one example of similar administration planning data in Embodiment 8 of this invention;

FIG. 30 presents diagrams showing examples of relations between investments and risk increases and relations between investments and risk declines in Embodiment 13 of this invention.

DESCRIPTION OF THE PREFERRED EMBODIMENTS

Embodiments 1 to 11 will be described by way of an inspection planning work of a plant, to which the application range of the invention should not be limited;

Embodiment 1

Figure 1:
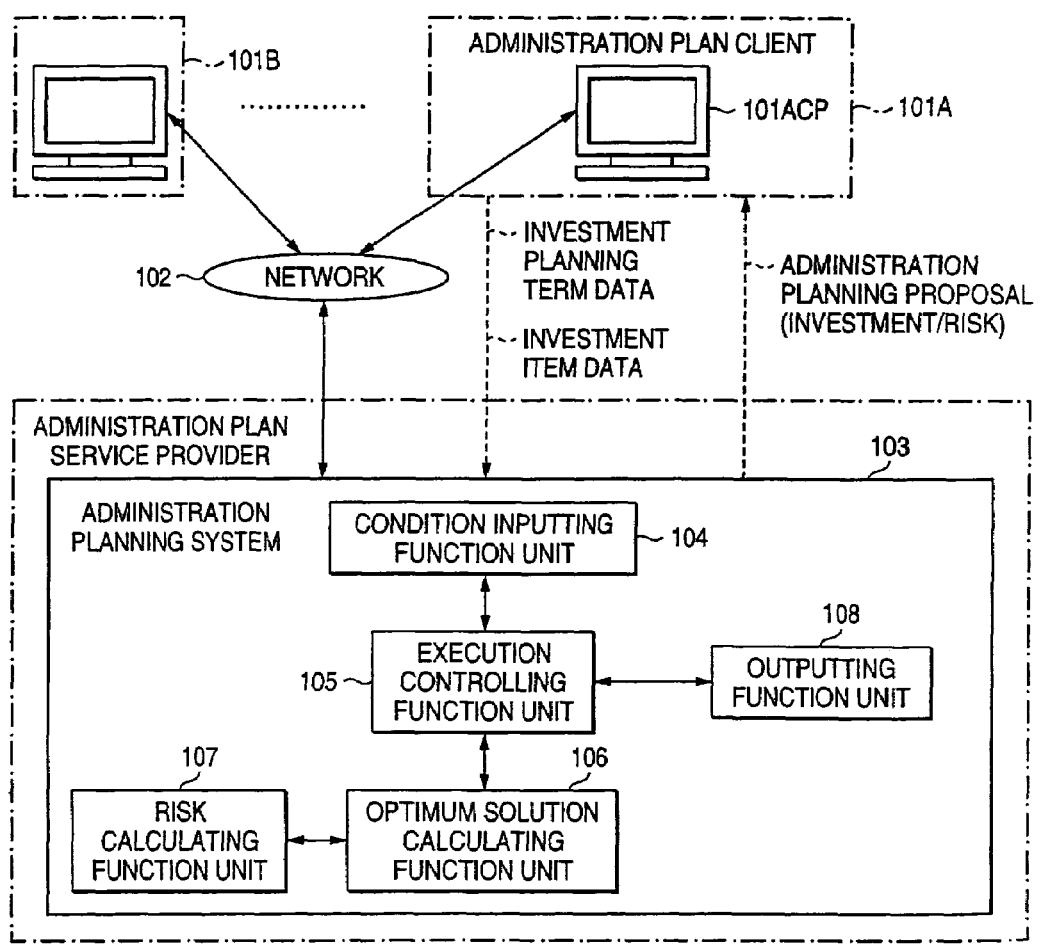
FIG. 1 is a diagram showing one example of a system construction of Embodiment 1 of this invention.

Embodiment 1 of this invention will be described with reference to the accompanying drawings. FIG. 1 shows one example of a system construction of Embodiment 1 of the invention. In FIG. 1, reference numeral 101A designates the site of an administration plan client, which is provided with an electronic terminal 101ACP such as a personal computer. Numeral 102 designates a network, which acts as transmission media for information transmissions between the electronic terminal 101ACP and a later-described administration planning system 103. This administration planning system 103 is constructed to include a CPU, a storage unit and an input/output unit mainly a so-called computer, and a program stored in the storage unit and adapted to be executed by the CPU, and is provided with at least following various function units, so that it performs the following actions and the following various functions. Here, pieces of information indicated by dotted arrows, i.e., the pieces of information to be provided by the administration plan client for an administration plan service provider, such as the "investment planning term data" or the "investment item data", or the pieces of information acquired, such as the "a planning proposal (investment/risk) are transmitted through the network 102 but may be transferred in the form of recording media such as CD-ROM.

Numeral 104 designates an inputting function unit for inputting various conditions such as at least the later-described planning term and investment items; numeral 105 an execution controlling function unit for controlling the functions of the CPU; and numeral 106 an optimum solution calculating function unit having an administration plan optimizing function to optimizing and adjusting the distribution between the investment levels for the investment items for a designated term in the planning term and risk levels calculated by the later-described risk calculating function, thereby to make an administration plan. Numeral 107 designates a risk calculating function unit for calculating the risk levels for each of the investment items on the basis of correlations between the investment level and a risk percentage corresponds its investment level. Numeral 108 designates an outputting function unit for outputting the administration plan made by the optimum solution calculating function unit 106 and the information while the administration plan is being made, to the display unit (i.e., an essential accessory of the computer, although not shown) of the administration planning system 103 or to the electronic terminal 101ACP of the administration plan client site 101A.

FIG. 2 shows one example of the plan term data and the administration item data in Embodiment 1 of the invention.

In FIG. 2 numeral 201 designates the plan term data, which is exemplified by July, August, - - - , and December. Numeral 202 designates the investment items, which are exemplified by Facility A, Facility B and Facility C. Facility A, B, C are components for forming one system or one apparatus, such as an inspection work system for a plant. In other words, the plan terms are exemplified by years, months and dates, define the time unit and the term duration for calculating the investment and the risk. The investment items are those which are enabled to acquire effects such as quality or safety by investing them. In the plan inspection planning work to be described, the individual facilities in the plant are the investment items. Here in order to keep the operating performances of the individual equipments, the investments are the costs for the daily inspections to be made every day and the periodic inspections (as will be shortly referred to as the "PI") to be made every year or every two years.

FIG. 3 shows an example of the administration plan including optimized investment levels and optimized risk levels which is made by the optimum solution calculating function unit 106. The sum of the assignment result of the investment for the individual investment items of FIG. 2, the investment of the whole plan terms and the risk is prepared as the administration plan. In FIG. 3, two kinds of the daily inspection cost and the periodic inspection costs are assigned individually to the facilities as the investment. For the facility A of the investment items, as shown, an investment sum IA1 and a risk sum RA1 are assigned to a daily maintenance level A (July and August) and a daily maintenance level B (October and November) 301, and an investment sum IA2 and a risk sum RA2 are assigned to an inspection level A 302. The investment sum IA (i.e., IA1+IA2) and the risk sum RA (i.e., RA1+RA2) are assigned to the entire facility A. The investment sum IA, IA1 and IA2 mean investment sum levels and the risk sum RA, RA1 and RA2 mean risk sum levels. The assignments are also made to other facilities B and C, as shown.

Figure 4:
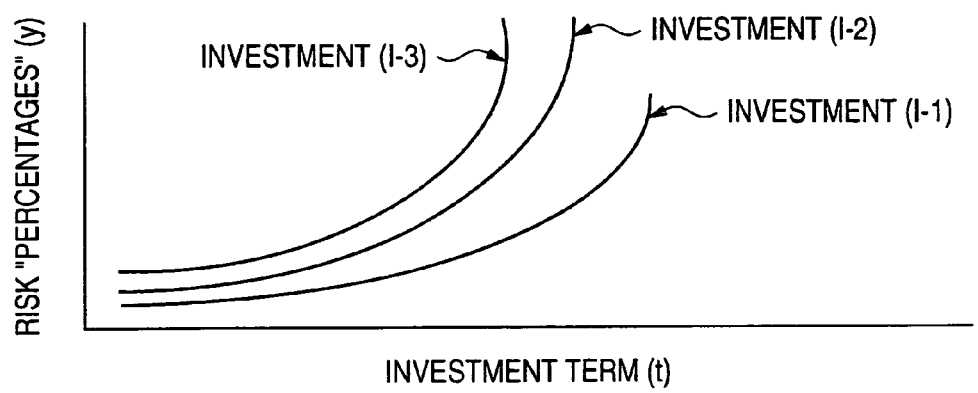
FIG. 4 is a diagram showing one example of relations between an investment and a risk percentage in Embodiment 1 of this invention.

FIG. 4 shows relations between the investment and the risk in Embodiment 1 of the invention. In the plant inspection planning work to be described in this embodiment, the individual facilities to be inspected are lowered in their performances by the deteriorations in the facility parts in accordance with the operating time. Without assignment of proper inspection costs, therefore, the plant inspection planning work is attended with a danger of risks such as troubles. The cost for the risks is caused by the fact that the investment items cannot retain the qualities which should be intrinsically satisfied. FIG. 4 shows the changes in the risk percentage by using investments to the items as parameters. As the investment is lowered from (I-1) to (I-3), the risk percentage rises. If the cost for the daily inspection is lowered in the plant inspection planning work, the deterioration of the facility is accelerated to raise the percentage of troubles.

Figure 5:
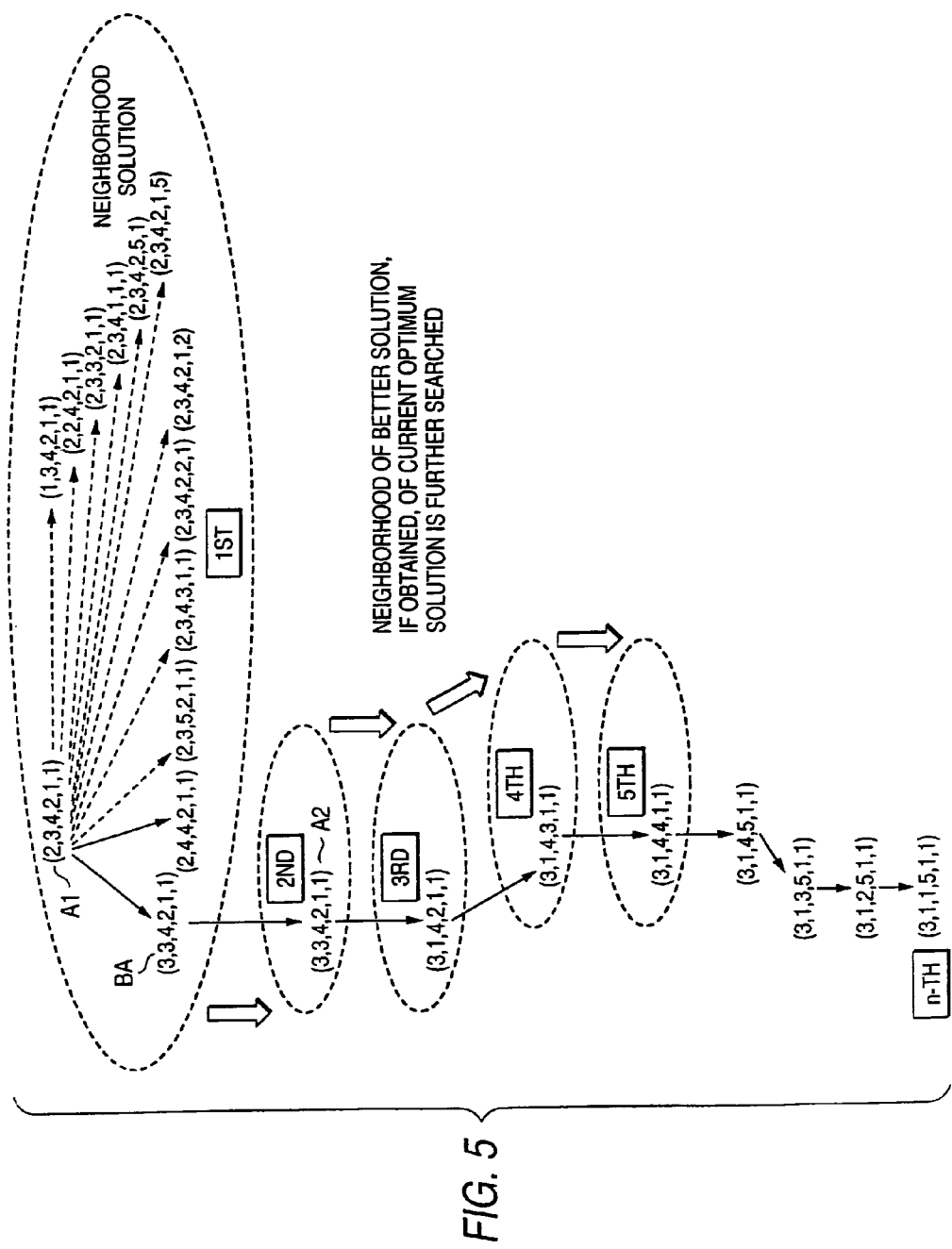
FIG. 5 is a diagram showing one example of a procedure for retrieving an optimum solution in Embodiment 1 of this invention.

FIG. 5 is a diagram showing one example of a procedure for optimizing the distribution of the costs for investment levels and risk levels by the optimum solution calculating function unit 106 in Embodiment 1 of the invention. It is assumed that the costs for inspecting the individual facilities are given levels (e.g., level 1 to level 5 in this embodiment) by the inspection item number or the inspection time, and that the inspection costs are determined at every level. At this time, the optimum assignment of the inspection costs for the individual facilities is determined by optimizing the assignment of the inspection levels. When the inspection levels of the individual facilities are given by integers 1 to 5, the assignment of the inspection levels to all the facilities is made for an initial solution A1 by using random values, and the total investment and the risk for the planning terms are calculated with that initial solution A1 ((2, 3, 4, 2, 1, 1) in FIG. 5)).

Next, one arbitrary element is selected from the inspection levels of the individual facilities assigned in the initial solution A1 thereby to set neighborhood solutions ((1, 3, 4, 2, 1, 1), (2, 2, 4, 2, 1, 1), - - - , and (3, 3, 4, 2, 1, 1) in FIG. 5)), of which the values of the inspection levels are incremented/decremented by 1. The total investment and the risk cost are calculated to select the solution (i.e., the combination of the inspection levels shown in FIG. 3), which minimizes the sum of the total investment and the risk cost, is selected as an optimum solution BA ((3, 3, 4, 2, 1, 1) of FIG. 5)) from the set of solutions including the initial one.

A neighborhood solution is likewise determined (at 2nd of FIG. 5) by using the newly determined optimum solution BA ((3, 3, 4, 2, 1, 1) of FIG. 5)) as an initial solution A2, and costs for the solutions are calculated. The optimum solution is updated if a better solution than the current optimum solution is obtained. These optimizing procedures are sequentially repeated like 3rd, 4th, - - - , and n-th, as shown in FIG. 5, till no combination of neighborhood solutions can update the optimum solution.

By thus providing the risk calculating function unit and the optimum solution calculating function unit, the effect-to-cost evaluations on the basis of the investment and the risk percentage can be made in the conventional administration planning work which has been done on the past experiences, thereby to optimize the administration plan.

Embodiment 2

Figure 6:
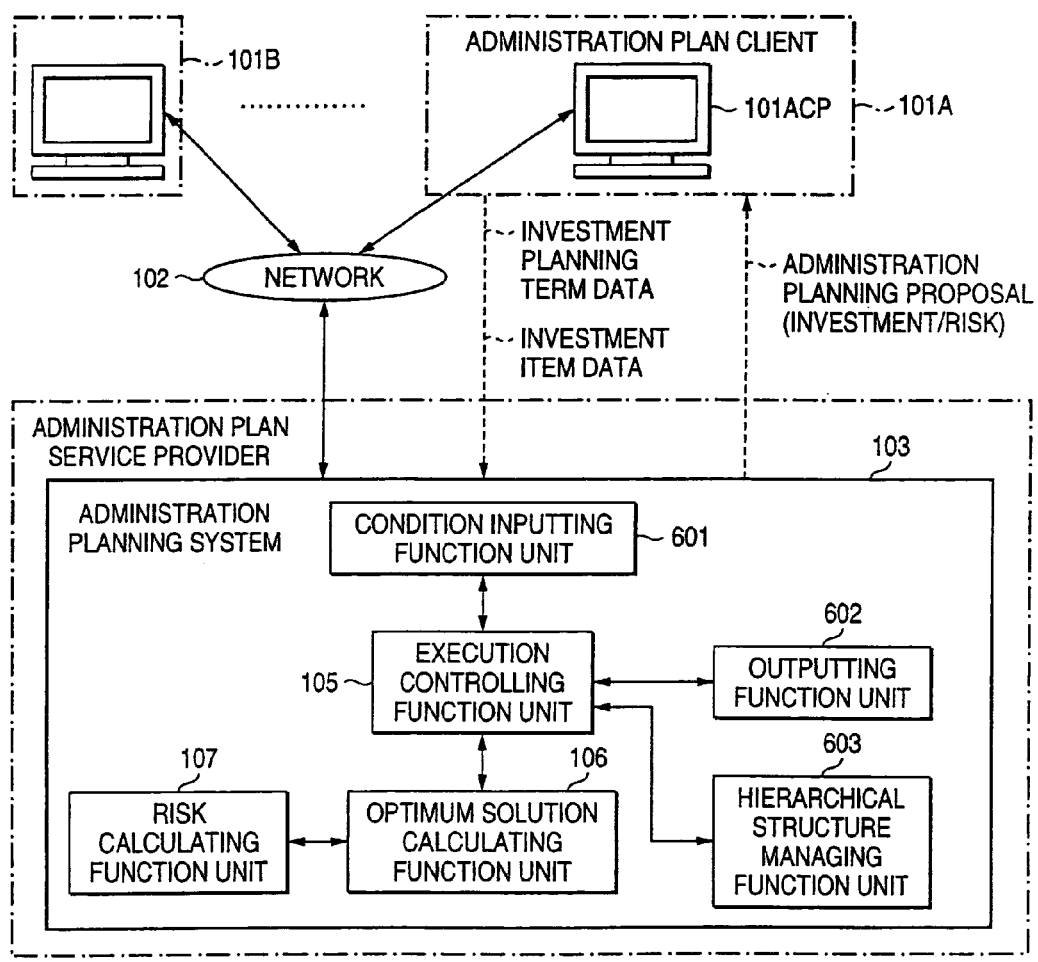
FIG. 6 is a diagram showing one example of a system construction of Embodiment 2 of this invention.

FIG. 6 shows one example of a system construction of Embodiment 2 of the invention. In FIG. 6, numerals 601, 602 and 603 designate an inputting function unit, an outputting function unit and a hierarchical structure managing function unit, respectively. The numerals 101 to 103 and 105 to 107 are identical to those of the foregoing Embodiment 1.

The actions of Embodiment 2 will be described by using the inspection works of a power plant as an example. In the inspection works of the power plant, the hierarchical structure of the administration plan is developed sequentially from the uppermost layer of the unit corresponding the entire facility of the plant, through a lower level layer of a system including large-sized facilities such as turbines, boilers and generators, to the lowermost layer of the equipments (e.g., pumps or valves) constructing the systems of the individual large-sized equipments and the parts of the individual equipments.

Figure 7:
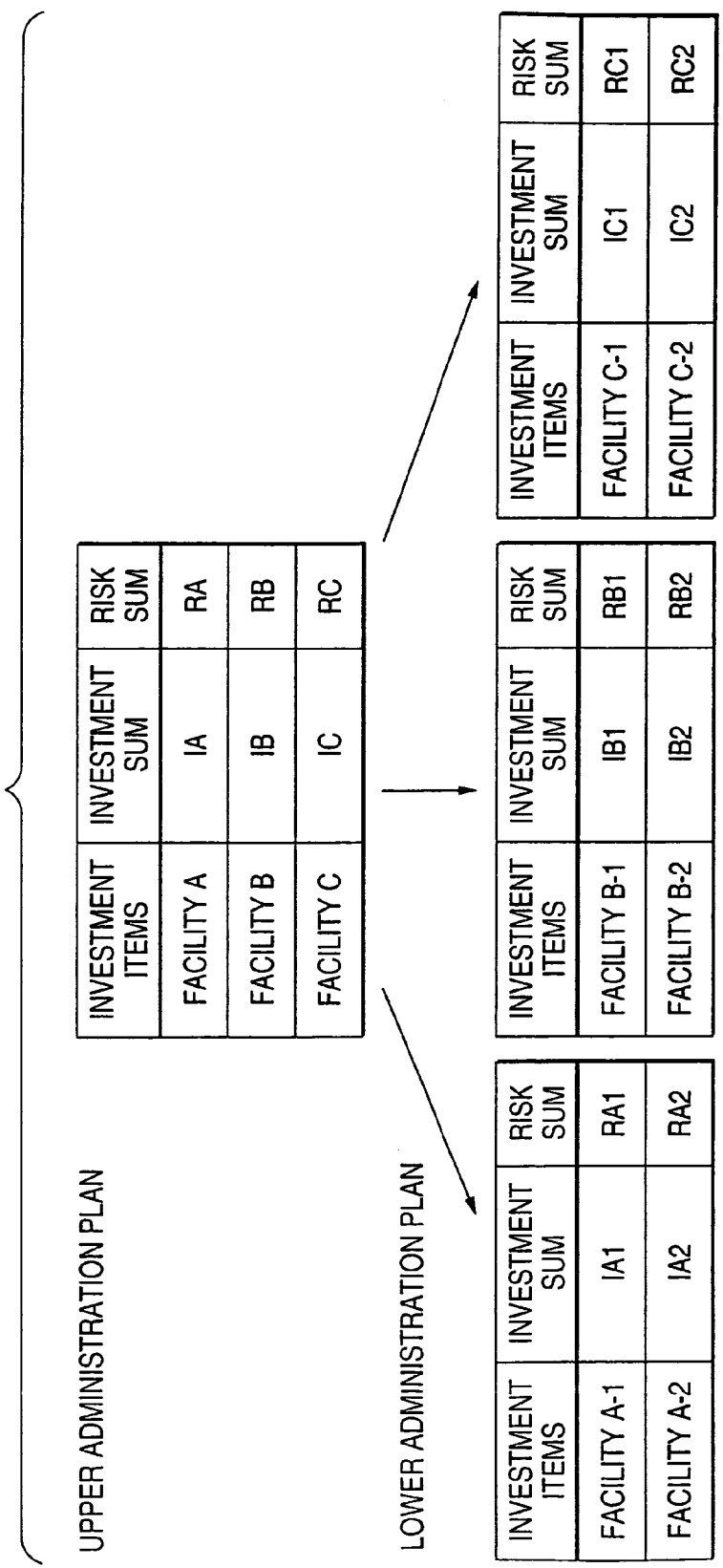
FIG. 7 is a diagram showing one example of a hierarchical structure of an administration plan in Embodiment 2 of this invention.

FIG. 7 shows a hierarchical structure of an administration plan in Embodiment 2 of the invention. The upper administration plan of the upper layer shows the making results of the entire administration plan of the large-sized equipments such as turbines, boilers or generators in the plant. The lower administration plan corresponding to the lower layer of that upper administration plan is the result of the optimization which has been executed on the costs for inspections and risks at the systematic levels of the individual large-sized equipments in response to the optimization results of the upper administration plan. Here, the meanings of the investment items, the investment sum and the risk sum in FIG. 7 are identical to the aforementioned ones of FIG. 3 so that their descriptions are omitted.

Figure 8:
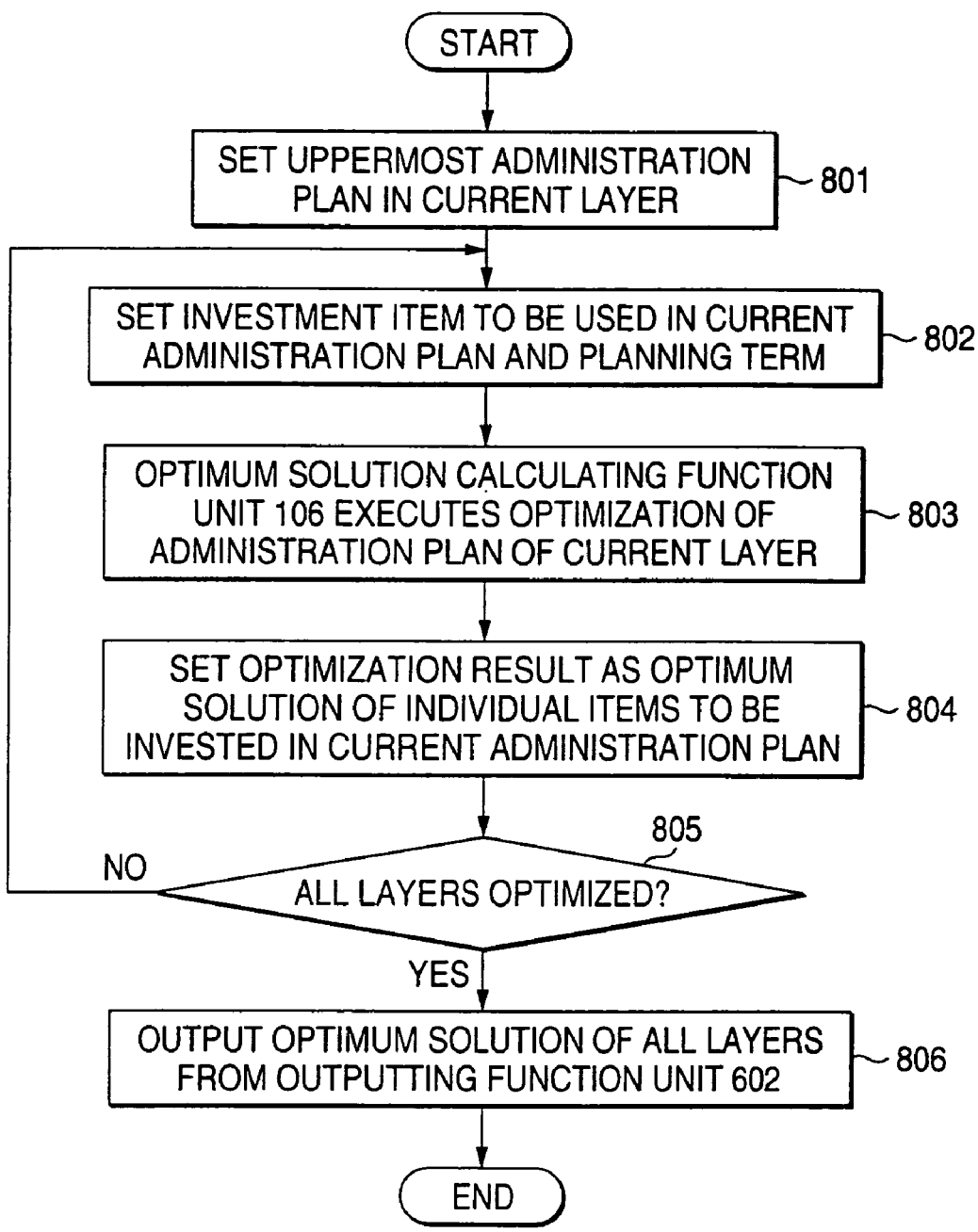
FIG. 8 is a diagram showing one example of a processing flow of an optimum solution calculating unit in Embodiment 2 of this invention.

FIG. 8 is shows a processing flow of the hierarchical structure managing function-unit 603 in Embodiment 2 of the invention. In the routine of the hierarchical structure managing function unit 603, specifically, the uppermost administration plan is set at first in the current layer (at Step 801). Next, there are set (at Step 802) the investment item and the planning term, which are to be used in the current administration plan. Next, the optimum solution calculating function unit executes the optimization of the administration plan of the current layer (at Step 803). Next, the optimization result is set as the optimum solution of individual investment items to be invested in the current administration plan (at Step 804). If the optimization of all layers is selected (or yes) at next Step 805, the routine advances to next Step 806, at which the optimum solution of all layers obtained is outputted from the outputting function unit 602. If the optimization of all layers is not selected (or no) at Step 805, on the contrary, the routine returns to Step 802 and advances again to Steps 803, 804 and 805.

On the basis of the investment item being optimized and the planning term, the optimum solution calculating function unit 106 searches the optimum solution by calculating the evaluation value of an evaluation function f with the following Formula 1.

$$f = \sum_N \sum_T Imn + \sum_N \sum_T Rmn$$

Here in Formula 1: Imn designates an investment in an item m for a term n; Rmn a risk on the item m for the term n; N an investment item; and T a plan term. In the upper administration plan, Imn and Rmn on the three facilities A to C are individually calculated as the investment items thereby to search the optimum solution by using the searching procedure of FIG. 5 in Embodiment 1.

When the optimization of the upper administration plan is completed, the results of the individual investment items contained in the administration plan are added to the constraining condition of the following Formula 2, to search the optimum solution of the evaluation function for the lower administration plan.

$$\text{Formula 2:} \quad \sum_N \sum_T Imn \leq I^u$$

Here in Formula 2, $I^U$ designates an upper limit to the sum of the investment.

In case an administration plan is made over a plurality of planning branches in an enterprise, for example, the entire administration plan can be divided into ones for individual charge branches, for example, by providing the hierarchical structure managing function unit 603 thereby to optimize the administration plan.

Embodiment 3

Figure 9:
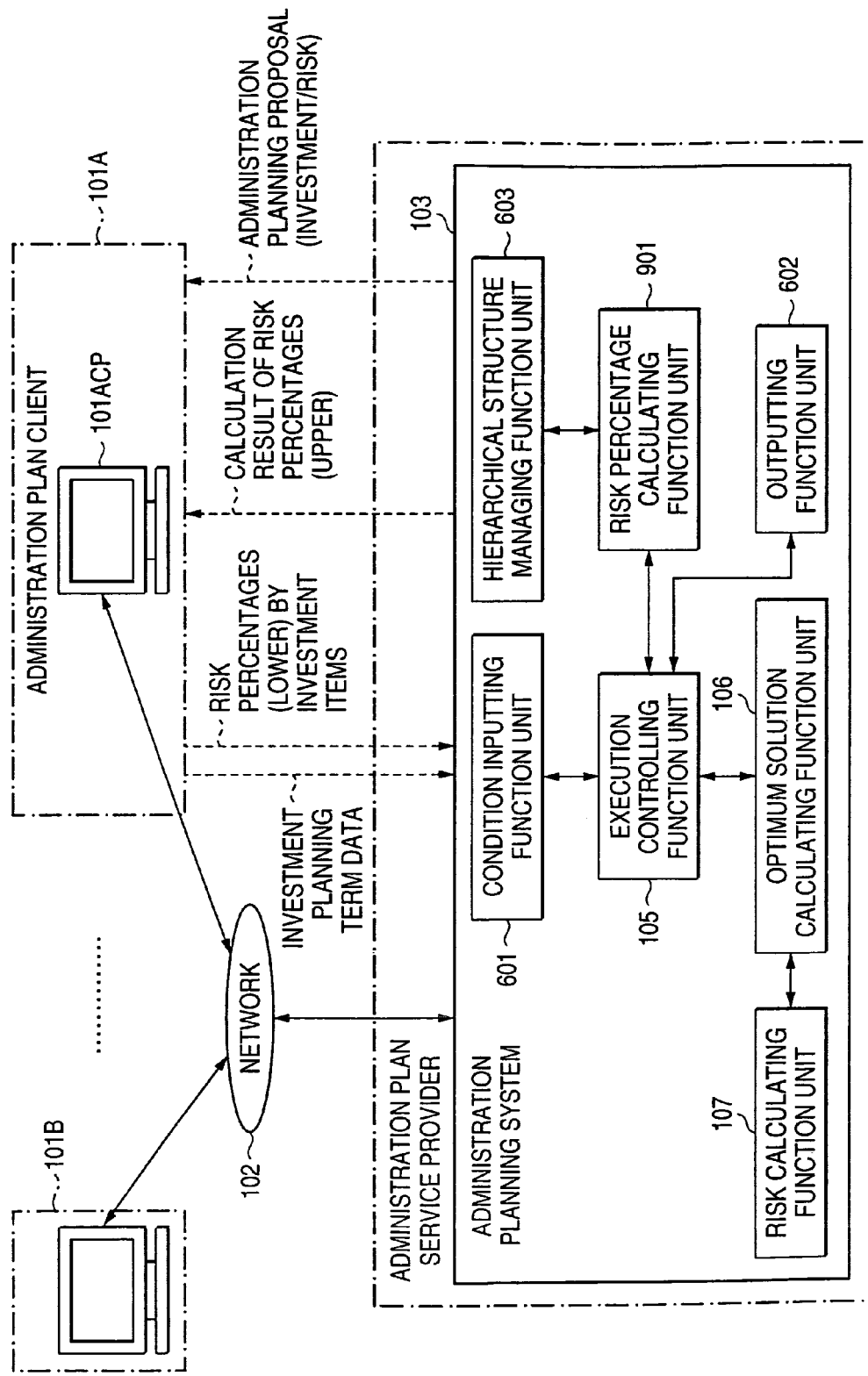
FIG. 9 is a diagram showing one example of a system construction of Embodiment 3 of this invention.

FIG. 9 shows one example of a system construction of Embodiment 3 of the invention. In FIG. 9, numeral 901 designates a risk percentage calculating function unit. Numerals 101 to 103 and 105 to 107 are identical to those of Embodiment 1. Moreover, numerals 601 to 603 are identical to those of Embodiment 2.

The actions of Embodiment 3 will be described by using the plant inspection planning works as an example.

Figure 10:
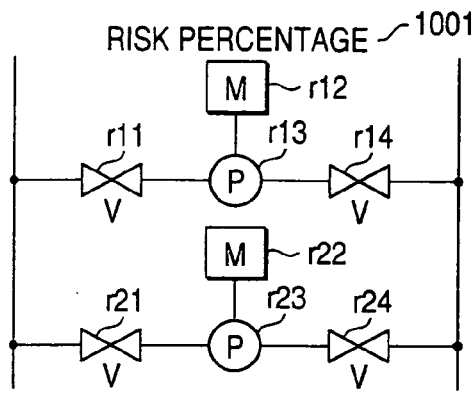
FIG. 10 is a diagram showing one example of an analysis of risk factors in Embodiment 3 of this invention.

FIG. 10 is a diagram showing one example of an analysis of risk factors in a block diagram. Symbols in FIG. 10 designate equipments (e.g., pumps motors or valves) included in the system of a large-sized facility. In FIG. 10: symbol P designates pumps; symbol M a motor; and symbol V valves. Letters r11 to r14 and r21 to r24 designate the trouble percentages of the individual equipments, which are calculated by using Weibull distribution function on the basis of the operating periods of the individual equipments. The risk percentage of the entire system of FIG. 10 is calculated on the basis of the risk percentages of the individual equipments.

Figure 11:
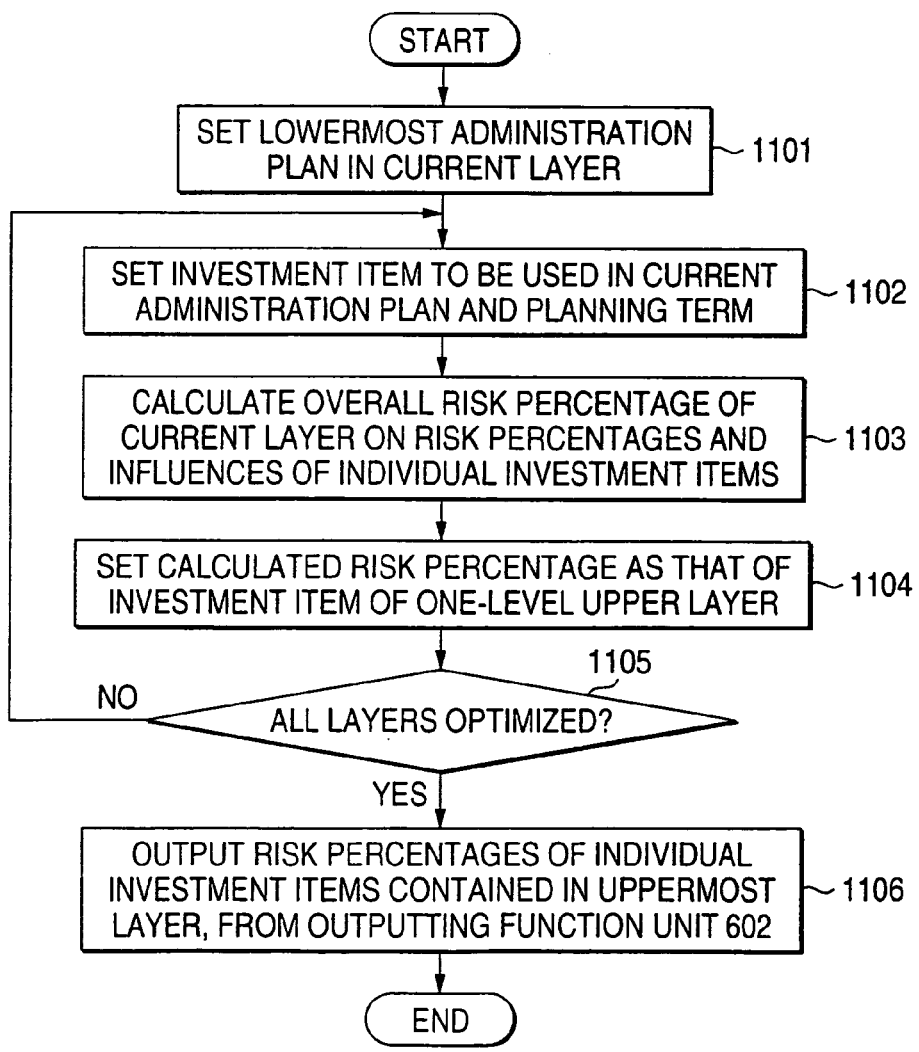
FIG. 11 is a diagram showing one example of a procedure for calculating risk percentages in Embodiment 3 of this invention.

FIG. 11 shows one example of a flow for processing risk percentage calculations. In FIG. 11 showing this processing flow, the lowermost administration plan is set in the current layer (at Step 1101). Next, the investment item to be used in the current administration plan and the planning term are set (at Step 1102). Next, the overall risk percentage of the current layer is calculated on the basis of the risk percentages and influences of the individual investment items (at Step 1103). Next, the calculated risk percentage is set as that of the investment item of the one-level upper layer (at Step 1104). If it is selected (or yes) at next Step 1105 that all layers are optimized, the routine advances to next Step 1106, at which the risk percentages of the individual investment items contained in the uppermost layer are outputted from the outputting function unit 602. If it is not selected (or no) at Step 1105 that all layers are optimized, on the contrary, the routine returns to Step 1102 and advances again to Steps 1103, 1104 and 1105.

Specifically, the calculations of the risk percentage are started from the lowermost layer of an administration plan problem. On the individual investment items contained in the administration plan problem of the lowermost layer, the risk percentage to be used for the risk calculations of the one-level upper layer referring to the current layer is calculated on the basis of a risk percentage designated. For the calculations of the risk percentage, the calculations as the product events between the risk factors and the calculations as the sum events between the risk factors are made from the connection relations between the risk factors defined in a risk factor analysis diagram.

Even in case the risk percentage of the investment item is determined by the relation between a plurality of risk factors, the entire risk percentage can be calculated by providing the risk percentage calculating unit, so that the optimizations can be achieved by using the entire risk percentage in the upper administration plan and the individual risk percentages in the lower administration plan.

Embodiment 4

The system construction of Embodiment 4 of the invention is identical to that of the aforementioned Embodiment 3 so that it will not be described. In this Embodiment 4, the administration planning system provides the administration plan client with the user interface function to prepare the risk factor analysis diagram of Embodiment 3 shown in FIG. 10, in a graphic display screen by interactively defining the arrangements and connection relations of the graphic elements indicating the events symbolically for the risk factors. The symbols indicating the individual risk factors are set with the risk percentages as their accessory attributes. On the basis of the risk factor analysis diagram defined by the administration plan client, the calculations of the entire risk percentages are executed by using the calculation procedure of FIG. 11 in the Embodiment 3.

Even in the case of a large number of risk factors necessary for calculating the risk percentages of the investment items, the relations between the risk factors can be hierarchically defined by providing the editing function of the risk factor analysis diagram, thereby to clarify the calculating procedure of the risk percentages.

Embodiment 5

Figure 12:
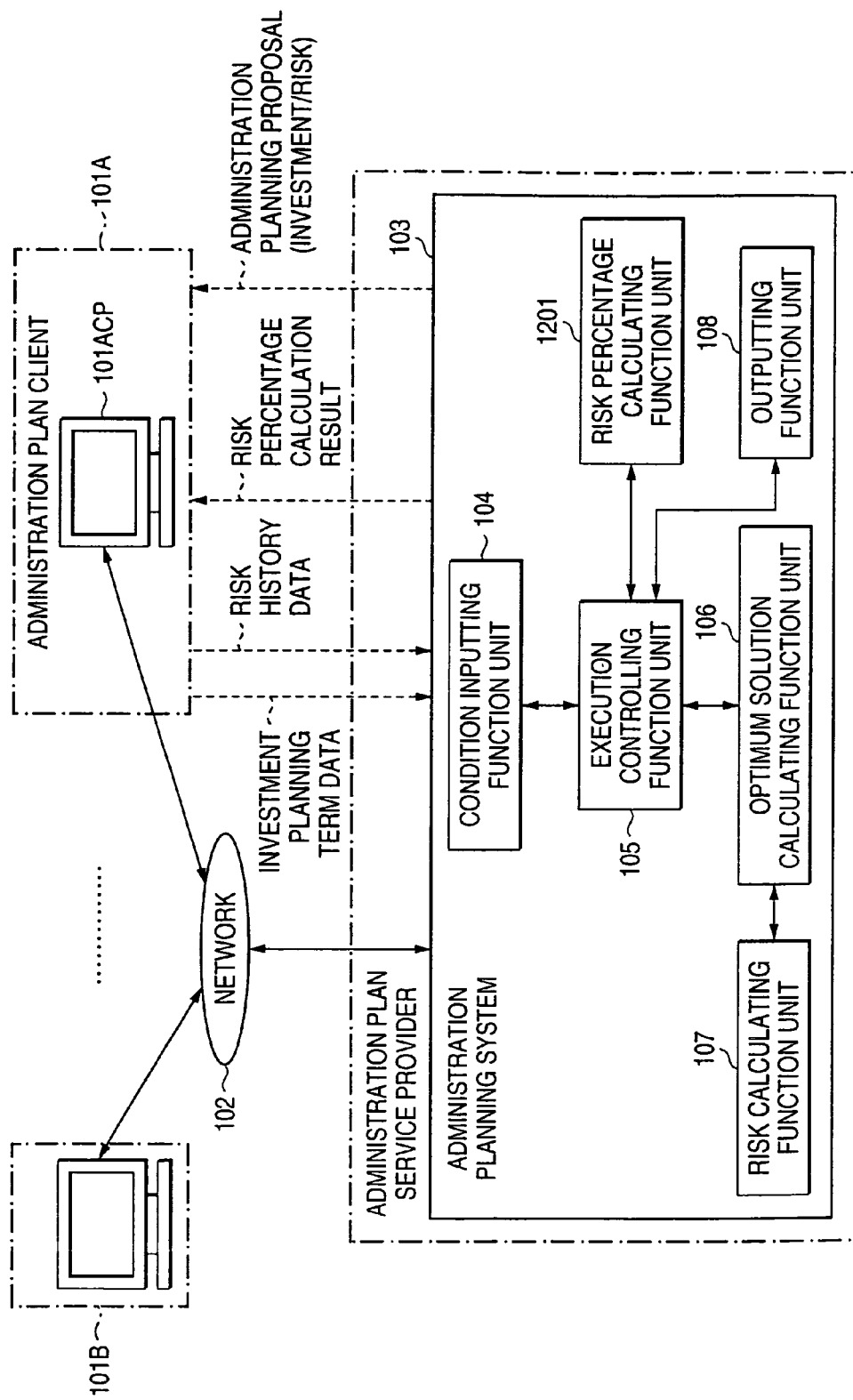
FIG. 12 is a diagram showing one example of a system construction of Embodiment 5 of this invention.

FIG. 12 shows one example of a system construction of Embodiment 5 of the invention. In FIG. 12, numeral 1201 designates a risk percentage calculating function unit. The invention does not specify the formula for calculating the risk percentage. The actions of Embodiment 5 will be described by way of the case in which the Weibull distribution function used in the trouble percentage distribution of a facility is employed in the calculation of the risk percentage.

Figures 13, 14:
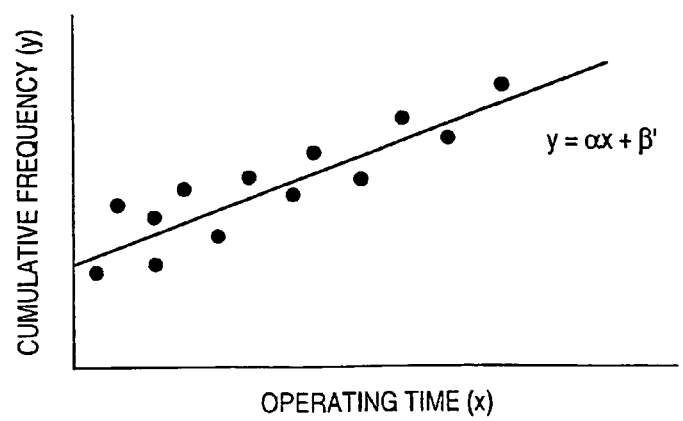
FIG. 13 is a diagram showing one example of risk history data in Embodiment 5 of this invention.
FIG. 14 is a diagram showing one example of a method of approximating the risk percentages in Embodiment 5 of this invention.

FIG. 13 shows one example of the structure of risk history data. The risk history data are constructed of facility numbers, facility kinds, periods till risks and risk countermeasures. The risk history of the same facility kind is retrieved from the risk history data, and the cumulative frequency of risks is calculated by using the periods till the risks as a classification standard.

Next, the correlation coefficient of the period and the cumulative frequency is calculated from the relation between the period till the risk and the cumulative frequency thereby to determined an approximate formula. FIG. 14 shows one example, in which an approximate function of a linear equation is determined in the case of a valve of FIG. 13. These procedures are repeated for every facility kind to calculate the correlation coefficients for every facility kind. In case the trouble distribution function of each facility follows the Weibull distribution function, the trouble percentage function F(t) given in the following Formula 3 is deduced by using the coefficient α of the approximate function as the shape parameter of the Weibull distribution function and the segment β as the time measure parameter.

Formula 3:
$$F(t) = \frac{\alpha t^{\alpha-1}}{\beta^\alpha}$$

By calculating the trouble percentages of the individual facilities for every period (e.g., months) in the administration planning terms, the risk cost is calculated from the calculated trouble percentages and the costs for repairing/replacing the parts at the time of a trouble.

By thus providing the risk percentage calculating function unit, the risk percentage data can be automatically set on the basis of the real data so that the works to adjust the necessary risk percentages need not be done for every investment item while improving the precision in the administration plan.

Embodiment 6

Figure 15:
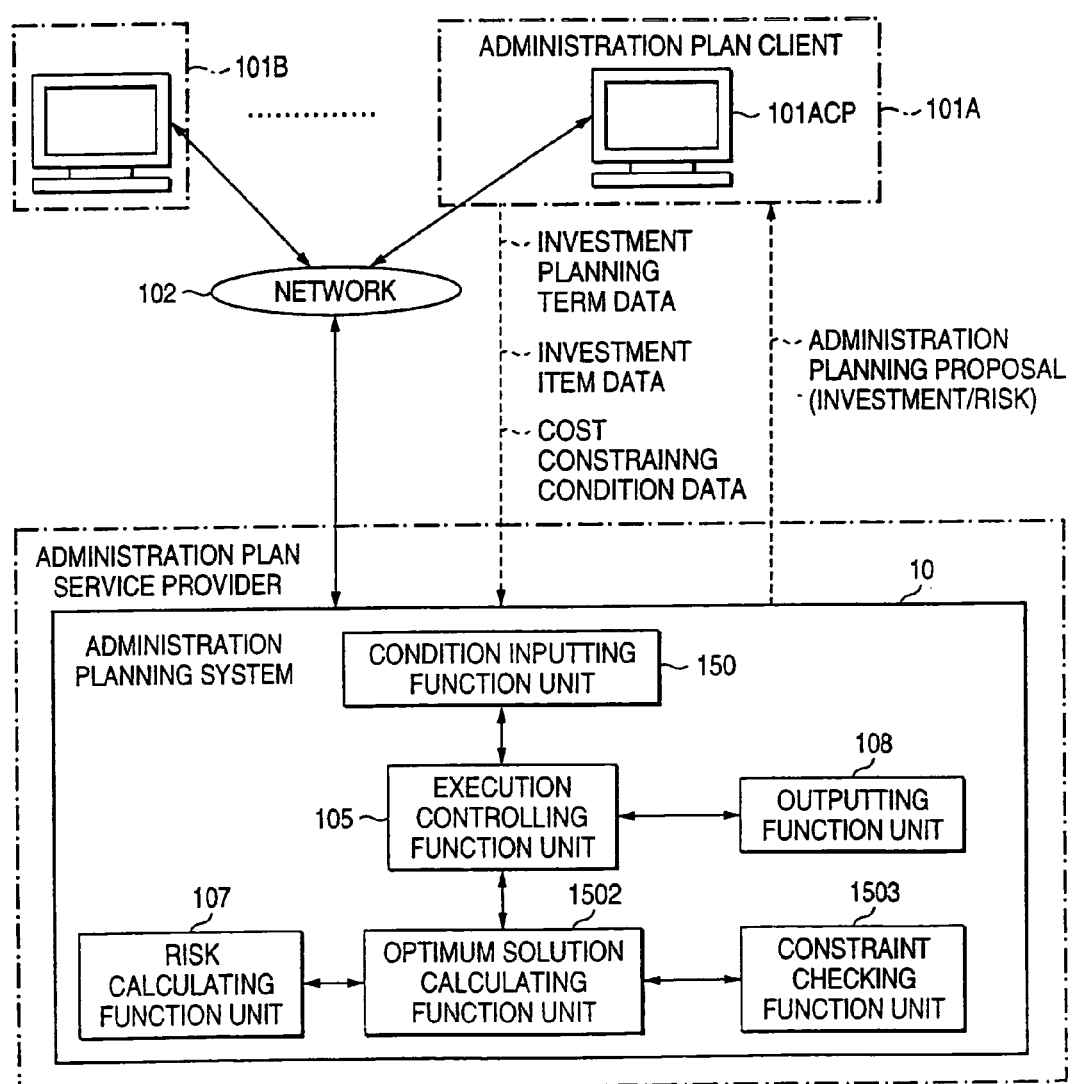
FIG. 15 is a diagram showing one example of a system construction of Embodiment 6 of this invention.

FIG. 15 shows one example of a system construction of Embodiment 6 of the invention. In FIG. 15, numeral 1503 designates a constraint checking function unit. The actions of Embodiment 6 will be described in the following.

Formula 4:
$$f = \sum_N \sum_T Imn + \sum_N \sum_T Rmn$$

Formula 5:
$$I^l \leq \sum_N \sum_T Imn \leq I^u$$

Formula 6:
$$R^l \leq \sum_N \sum_T Rmn \leq R^u$$

Here in Formula 4: Imn designates an investment in the item m for the term n; Rmn a risk on the item m for the term n; $I^l$ a lower limit (or one constraining condition) to the sum of the investment; $I^u$ an upper limit (or one constraining condition) to the sum of the investment; $R^l$ a lower limit (or one constraining condition) to the sum of the risk; $R^u$ an upper limit (or one constraining condition) to the sum of the risk; N the investment item; and T the plan term.

The optimum solution calculating function unit 1502 calculates the value of the evaluation function f according to Formula 4 to search the optimum solution. The administration planning works of Embodiment 1 are optimizing calculations for $I^l=0$, $R^l=0$, $I^u\infty$ and $R^u=\infty$.

The administration plan client confirms the sum of the investment of the individual investment items and the risks when there is presented the administration plan which has been made under the condition of no constraint. In Embodiment 6, it is checked by the constraint checking function unit 1503 according to Formula 5 and Formula 6 whether or not the current solution exceeds the lower limit and the upper limit of the sum of the investment and the risk and the individual lower limits and the individual upper limits of the of the investment and the risk, i.e., whether or not the current solution is against the constraining condition. Unless against the constraining condition, it is checked whether or not the distribution of the lower limit of the investment or the cost is biased. With a bias, the optimizing calculations are executed by the optimum solution calculating function unit 1502 by adding the constraining condition on the investment or the risk in the direction to eliminate the bias.

Figure 16:
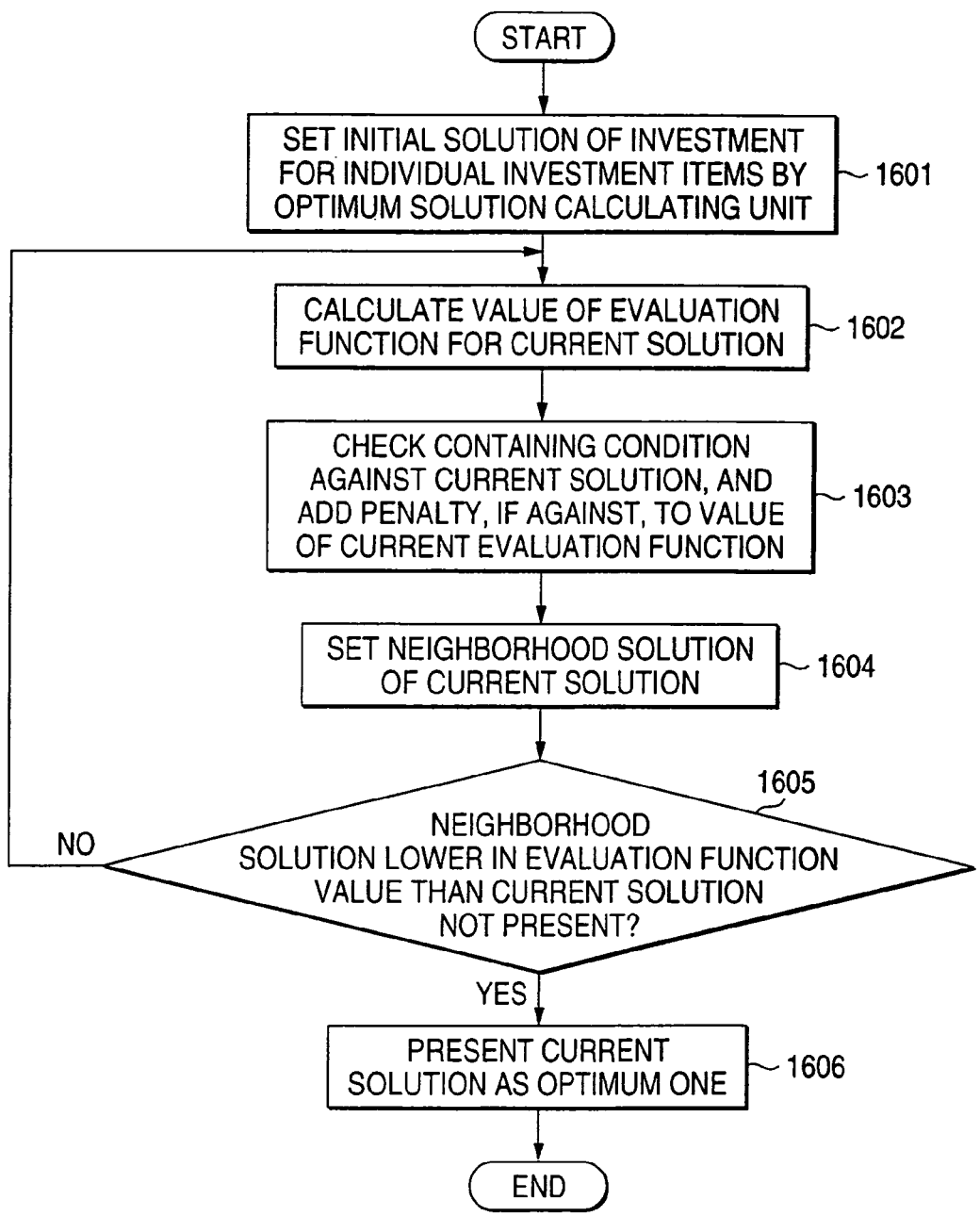
FIG. 16 is a diagram showing one example of an optimum solution calculating procedure considering the constraining condition in Embodiment 6 of this invention.

FIG. 16 shows one example of the processing flow of the case of acquiring the optimum solution while eliminating the neighborhood solution against the constraining condition, if any. First of all in FIG. 16, the optimum solution calculating unit sets the initial solution of the investment for the individual items (at Step 1601). Next, the value of the evaluation function for the current solution is calculated (at Step 1602). Next, the constraining condition against the current solution is checked. If against the constraining condition, a penalty is added to the evaluation value of the current evaluation function (at Step 1603). With this addition of the penalty, the evaluation value goes out of the neighborhood solution so that it is not a neighborhood solution candidate at the next neighborhood solution setting time. Next, a neighborhood solution of the current solution is set (at Step 1604). If the answer of next Step 1605 is yes, i.e., a lower neighborhood solution in the evaluation function value than the current solution is not present, the routine advances to next Step 1606, at which the current solution is outputted as the optimum solution from the outputting function unit 602. If the answer of Step 1605 is no, i.e., a lower neighborhood solution in the evaluation function value than the current solution is present, on the contrary, the routine returns to Step 1602 and advances again to Steps 1603, 1604 and 1605.

By thus providing the constraint checking function unit 1503, it is possible to make the administration plan under the various cost constraints and to confirm the influences of the constraining conditions on the administration plan.

Embodiment 7

Figure 17:
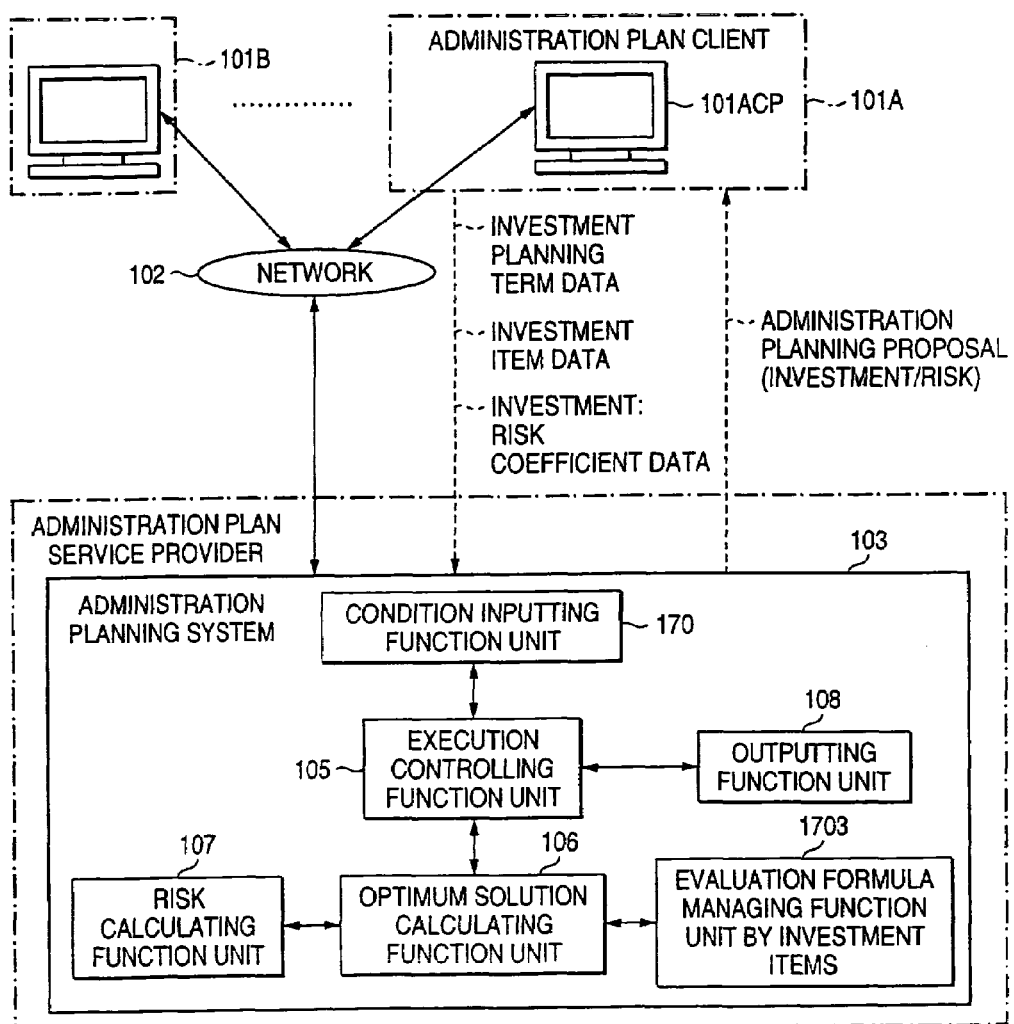
FIG. 17 is a diagram showing one example of a system construction of Embodiment 7 of this invention.

FIG. 17 shows one example of a system construction of Embodiment 7 of the invention. In FIG. 17, numeral 1703 designates an evaluation formula managing function unit by investment items. In Embodiment 7 of the invention, the evaluation value of the evaluation function f is calculated to search the optimum solution with the following Formula 7.

Formula 7:
$$f = \sum_N \left( W1m \times \sum_T Imn \right) + \sum_N \left( W2m \times \sum_T Rmn \right)$$

Here in Formula 7: Imn designates an investment in the item m for the term n; Rmn the risk on the item m for the term n; and W1m and W2m weight coefficients for adjusting the distribution of the investment and the risk by the individual investment items.

The actions of Embodiment 7 will be described in the following. The administration planning works of the foregoing Embodiment 1 are the optimizing calculations with both the W1m and W2m being set at 1. The administration plan client confirms the ratio of the investment and the risk for each investment item when there is presented the administration plan which has optimized the distribution of the investment and the risk with that standard setting. For the entire optimizations, it is checked whether or not a sufficient investment has been made on the investment item having a high importance and whether or not an investment more than necessary has been made on the investment item having a low importance. If the balance of the cost assignment is not proper among the investment items, the optimizing calculations are executed by designating the coefficients W1m and W2m. FIG. 18 shows an example of the evaluation coefficients.

By thus providing the evaluation formula managing function unit by the investment items 1703 for the evaluation coefficient managements, the setting of the evaluation function formula to be used in the optimum solution research can be altered with the convenient means thereby to make the administration plan reflecting the difference of importance on the individual investment items.

Embodiment 8

Figure 19:
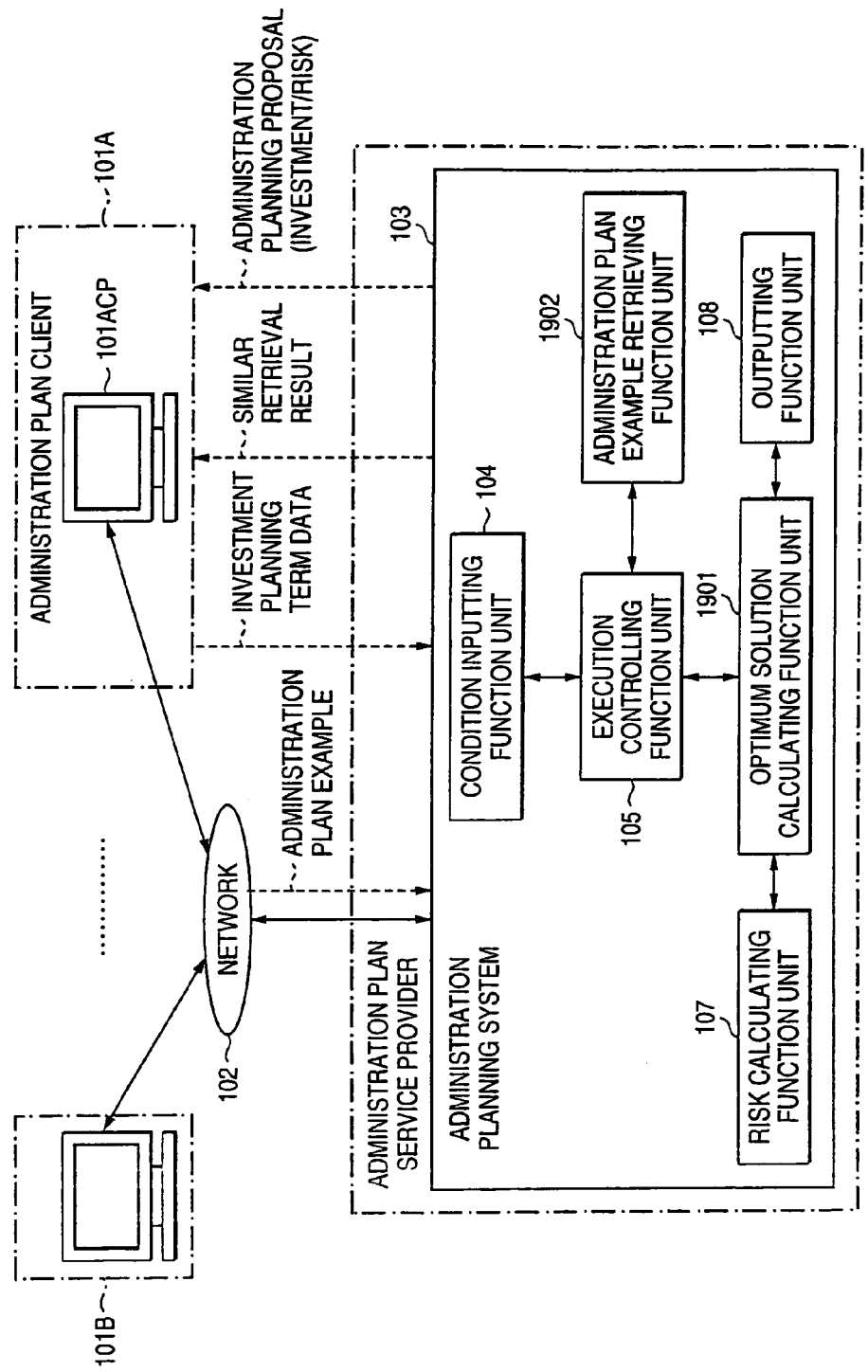
FIG. 19 is a diagram showing one example of a system construction of Embodiment 8 of this invention.

FIG. 19 shows one example of a system construction of Embodiment 8 of the invention. In FIG. 19, numeral 1901 designates an optimum solution calculating function unit, and numeral 1902 designates an administration plan example retrieving function unit. FIG. 20 shows one example of a construction of the administration plan example. The administration plan example in FIG. 20 is composed of case numbers, plan terms, investment items 1 to N, risk calculating formula kinds, an investment assignment result and a risk assignment result.

The actions of Embodiment 8 will be described in the following. The administration plan example retrieving function unit 1902 retrieves an administration plan example by using the investment item inputted by the plan client and the planning term data as the retrieving condition, and presents the retrieval result to the plan client. The plan client selects the administration plan similar to the current one from the retrieval result, and sets the assignment result (corrected in data, if necessary) of the investment and the risk contained in the retrieval result, as the initial solution. The optimum solution retrieving unit retrieves the neighborhood solutions of the initial solution sequentially by using the initial solution as the initial value of the solution retrievals, as shown in FIG. 5, to determine the optimum solution.

By thus providing the administration plan example retrieving function unit 1902, the validity of the administration plan being made can be confirmed by comparing it with the past similar examples.

Embodiment 9

Figure 21:
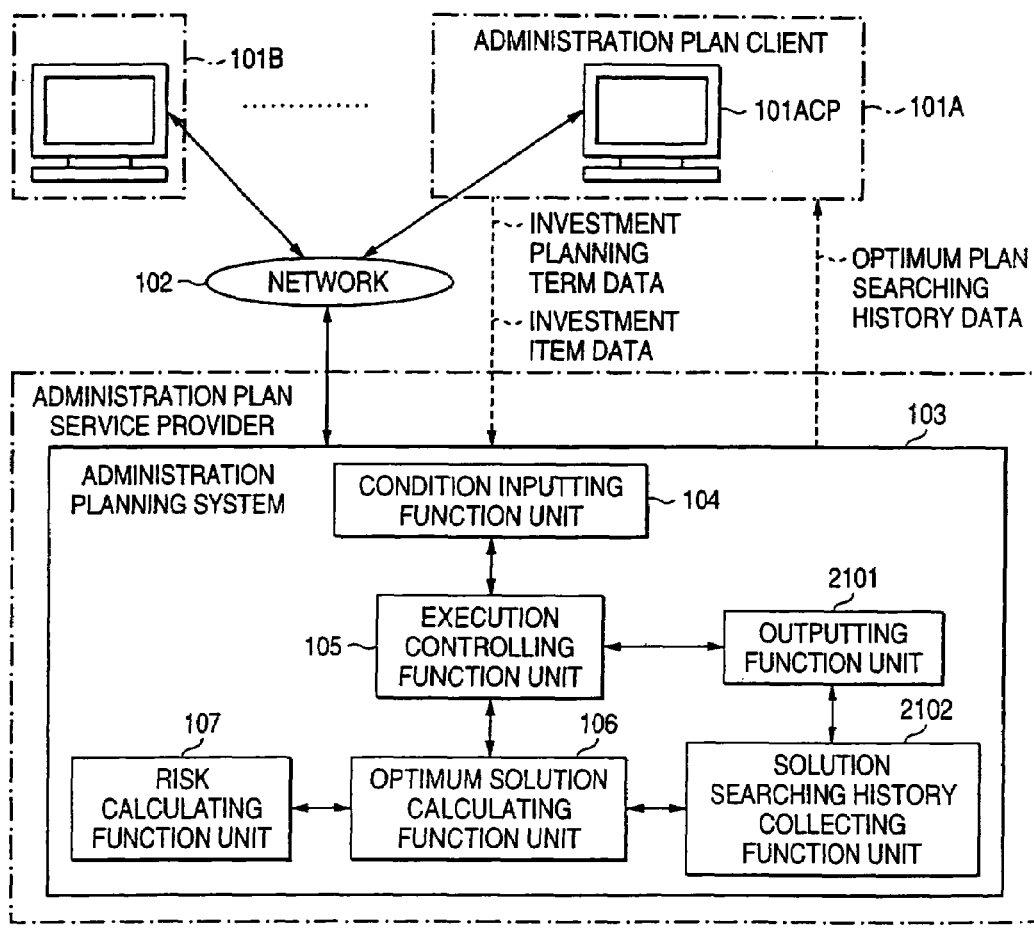
FIG. 21 is a diagram showing one example of a system construction of Embodiment 9 of this invention.
Figure 22:
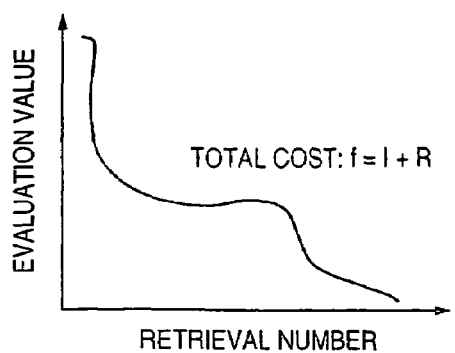
FIG. 22 is a diagram showing a relation between a retrieval number and evaluation value in Embodiment 9 of this invention.

FIG. 21 shows one example of a system construction of Embodiment 9 of the invention. In FIG. 21, numeral 2101 designates an outputting function unit for outputting searching history display information, and numeral 2102 designates a searching history collecting function unit. FIG. 22 shows one example of a relation between a retrieval number and evaluation value. FIG. 22 is a graph expressing the value of the evaluation function, as obtained in each process of the solution retrieval of FIG. 5, together with the retrieval number by the time the evaluation value is obtained.

The actions of Embodiment 9 will be described in the following. As the values of the investment item number and the planning period increase, the calculations required for the optimum solution calculating unit to calculate the solution rises in the manner of an exponential function. It is, therefore, difficult for the planner to search all the combinatorial patterns within the time period of receiving the service provision, and the making of the administration plan is requested by giving the retrieval number an upper limit. The diagram of FIG. 22 of the relations between the retrieval number and the evaluation value shows the conversion situation of the searches by presenting the evaluation value decreasing behaviors to the plan client with the graphic presentation or the table presentation.

By thus providing the searching history collecting function unit 2102, it is possible to execute the search of the optimum solution efficiently within the limited time period and to confirm the validity of the solution obtained.

Embodiment 10

Figure 23:
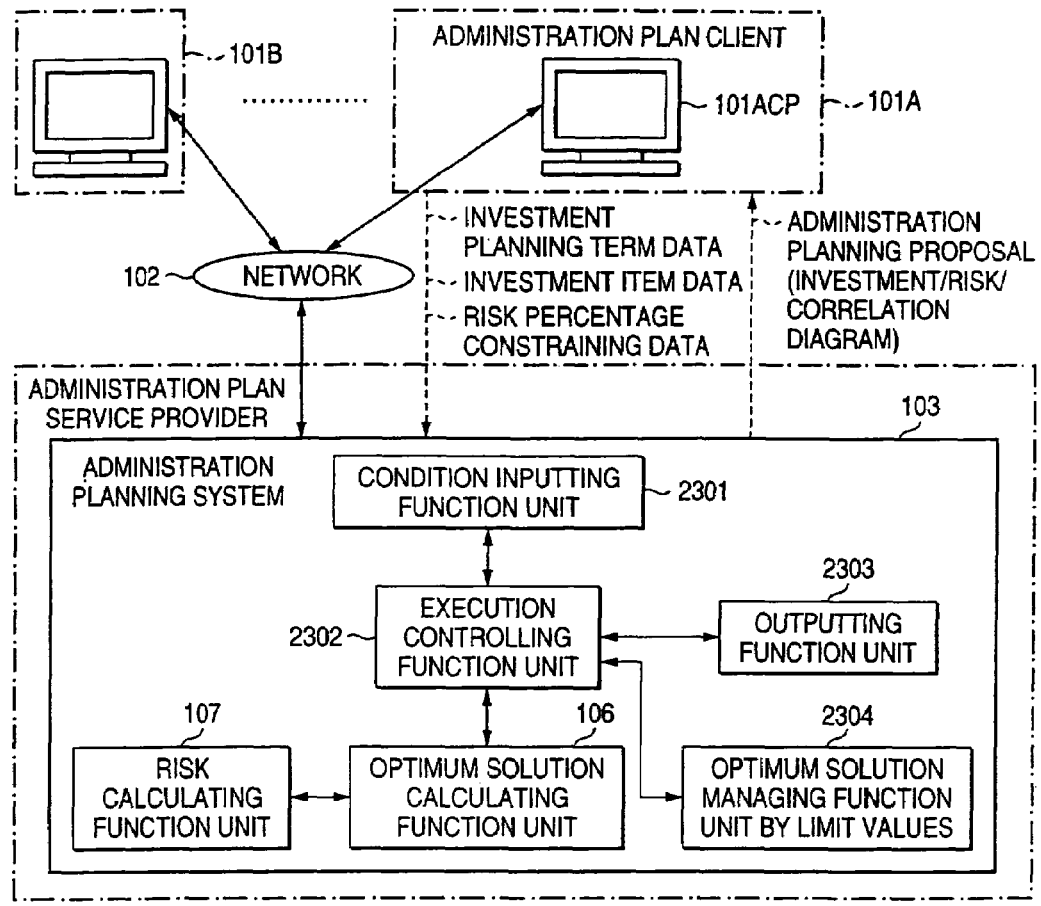
FIG. 23 is a diagram showing one example of a system; construction of Embodiment 10 of this invention.
Figure 24:
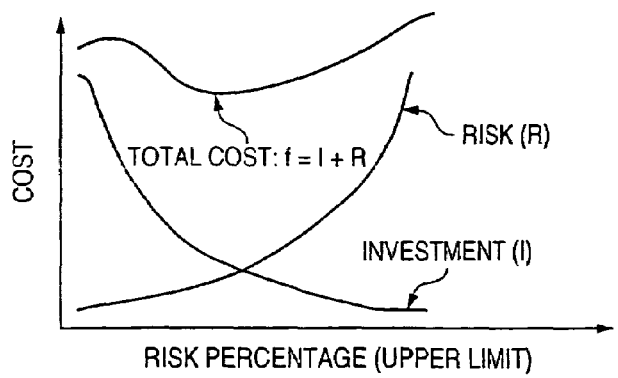
FIG. 24 is a diagram showing one example of correlations between constraining conditions and cost in Embodiment 10 of this invention.

FIG. 23 shows one example of a system construction of Embodiment 10 of the invention. In FIG. 23, numeral 2303 designates an outputting function unit for outputting a correlation diagram display information, and numeral 2304 designates an optimum solution managing function unit by limit values. FIG. 24 shows one example of the correlations between a risk percentage (in an upper limit), and an investment and a risk. The upper limit of the risk percentage in FIG. 24 is the maximum risk percentage that can be taken by each investment item for the planning term in the relation diagram of FIG. 4 between the investment and the risk percentage.

The actions of Embodiment 10 will be described in the following. The optimum solution calculating function unit 106 makes such an assignment of the investment that the maximum risk percentage designated within the investment term may not be exceeded. An execution controlling function unit 2302 sets the maximum risk percentage at a determined notch width (of 1.0 or 0.1) and optimizes the administration plan using the risk percentage as the constraining condition. The outputting function unit 2303 outputs the information data in which the transition of the sum of the investment and the risk under the constraining condition of each risk percentage is plotted in the correlation diagram, and presents the information data to the plan client.

By thus providing the outputting function unit 2303 for outputting the correlation diagram display information (of FIG. 24), the result of the administration plan made under a plurality of conditions can be presented to grasp the tendency of the effect-to-cost intuitively.

Embodiment 11

Figure 25:
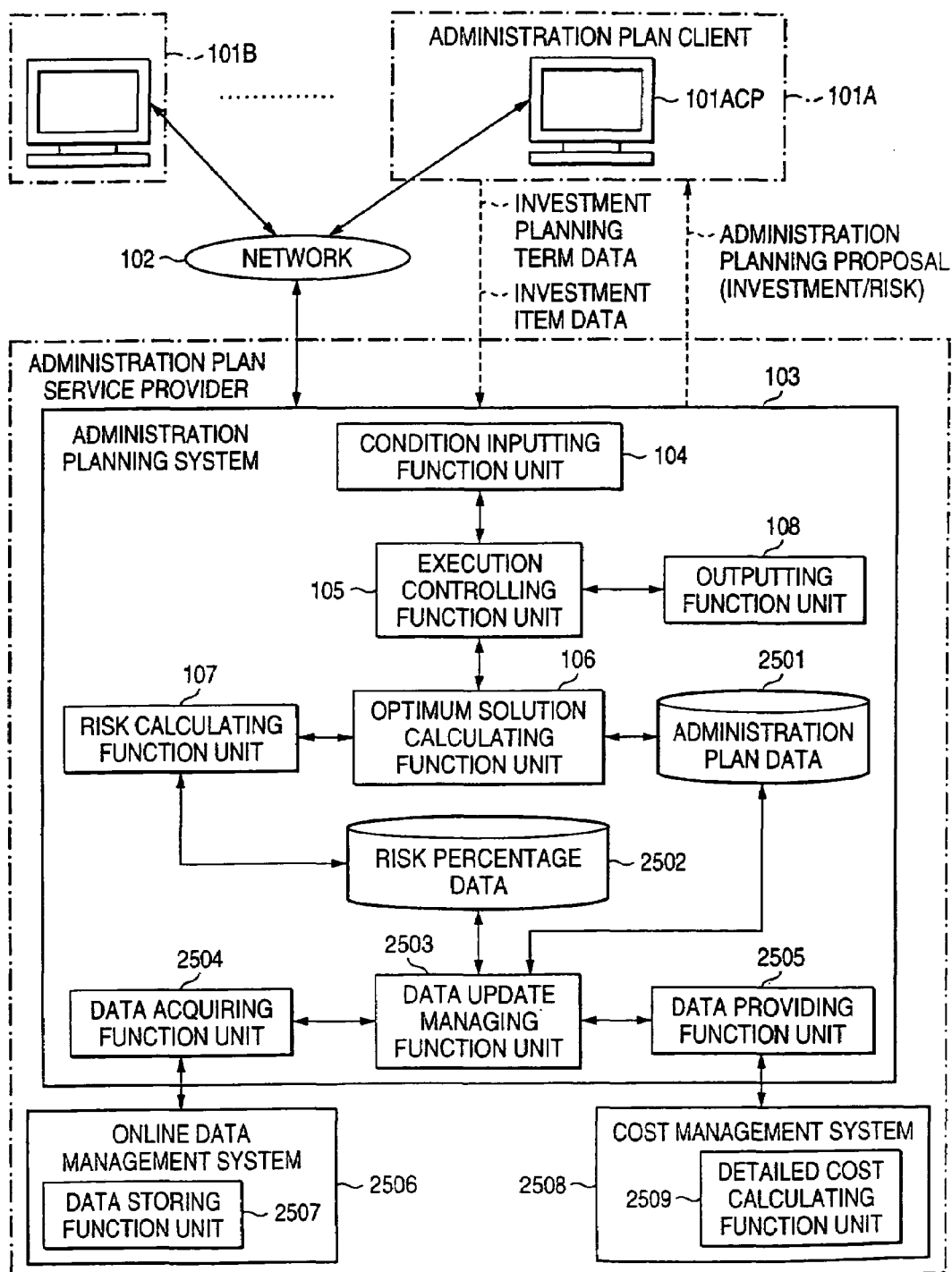
FIG. 25 is a diagram showing one example of a system construction of Embodiment 11 of this invention.

FIG. 25 shows one example of a system construction of Embodiment 11 of the invention. In FIG. 25: numeral 2501 designates administration plan data; numeral 2502 risk percentage data; numeral 2503 a data update managing function unit; numeral 2504 a data acquiring function unit; numeral 2505 a data providing function unit; numeral 2506 an online data management system; numeral 2507 a data storing function unit; numeral 2508 a cost management system; and numeral 2509 a detailed cost calculating function unit.

The actions of Embodiment 11 will be described by using plant inspection planning works as an example. The administration planning system according to the invention uses the risk percentage probability data in the risk calculations. In order to improve the reliability of the administration plan, it is necessary to improve the precision of the risk percentage probability data. The online data management system 2506 in Embodiment 11 collects sample data for the risk percentage in the data storing function unit 2507. The risk percentage history data such as deteriorations or troubles during the operations of the plant are collected continuously for a long term so that the data necessary for the risk percentage and the precision improvement are obtained. The history of replacements and repairs of troubled parts is sequentially added to the risk percentage history data.

The data acquiring function unit 2504 collects the risk percentage history data stored in the online data management system, periodically, and it is checked at the data update managing function unit 2503 whether or not a risk concerned with an investment item to be managed by the administration plan managing system is occurring. In case the risk occurs, the risk percentage is calculated again, and the risk percentage data 2502 are updated.

When the risk percentage data are updated in the procedure thus far described, it is checked by the data update managing function unit whether or not the plan has to be updated on the administration plan data 2501 made with reference to the updated risk percentage data. In case the update time of the risk percentage data is contained in the planning term, the administration plan is calculated again by using the risk percentage data updated. Next, the data providing function unit 2505 provides the cost management system 2508 with the investment which is contained in the administration plan acquired by the re-calculations. In the cost management system, the given total cost is used for calculating the costs of individual items in the detailed cost calculating function unit 2509. For example, the plant inspecting works calculate the labor cost of the workers who execute the inspecting works when the sum of the inspection cost is given.

By thus providing the data acquiring function unit 2504 and the data providing function unit 2505, which are associated with the data management system 2506 and the cost management system 2508, and the data update managing function unit 2503 for automatically discriminating the range of influences caused by the data change, the stored data can be reflected at a proper timing on the risk percentage calculations, and the reliability of the entire system can be improved as the data storage amount increases.

Embodiment 12

Figure 26:
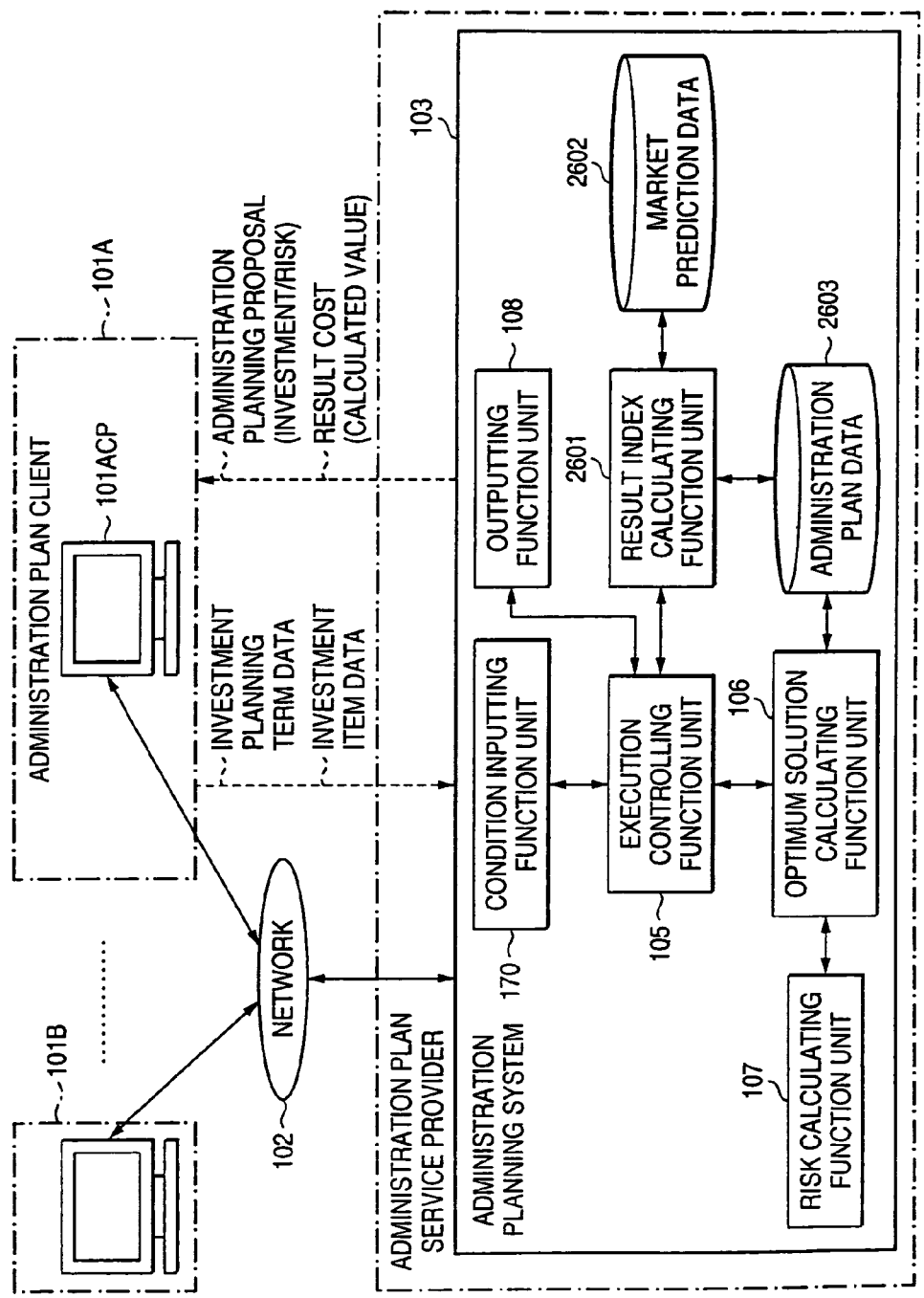
FIG. 26 is a diagram showing one example of a system construction of Embodiment 12 of this invention.

One example of a system construction of Embodiment 12 of the invention is shown in FIG. 26. In FIG. 26: numeral 2601 designates a result index calculating function unit; numeral 2602 market prediction data; and numeral 2603 administration plan data.

The administration plan to be made in the invention makes the various investments in the enterprise administration, proper on the basis of the relation to the risk, which may occur during the planning term. The administration plan client 101A decides whether or not the administration plan is to be adopted, by evaluating the administration plan presented, from the viewpoints of the investment to each item and the risk percentage and the viewpoints of the financial accounts of the entire investment.

In the viewpoints of the financial accounts, the items relating to the cash flow, such as the payment on the facility investment, the business expense or the business income are the fundamental data for the result evaluations. The business income is used for evaluating the data 2602, which have predicted the future market trends such as the growth in demands or the change in the sales prices in several cases.

Figure 27:
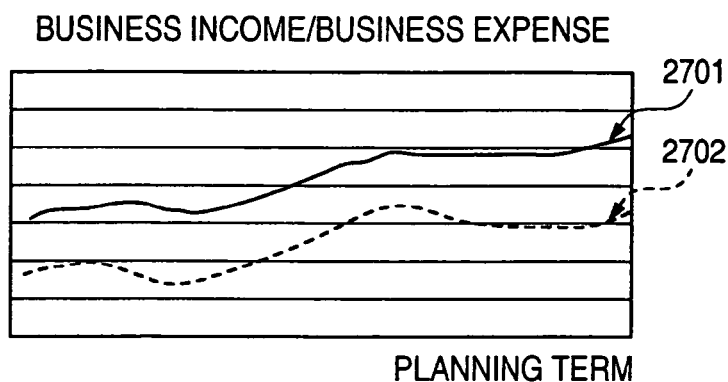
FIG. 27 is a diagram showing one example of market prediction data in Embodiment 12 of this invention.

FIG. 27 shows one example of the market prediction data 2602. A graphic curve in FIG. 27 indicates the business incomes, which have been calculated on the basis of the predicted values of sales and market values for the planning term. Numeral 2701 designates the business income, and numeral 2702 designates the business expense.

The administration plan made by the optimum solution calculating function unit 106 contains all the investments for the planning term. The result index calculating function unit 2601 totalizes the investment for every unit period (e.g., year or month) to execute the result evaluations, and makes the business index value for the period from the totalized investment and the business income and expense of the market prediction data.

Figure 28:
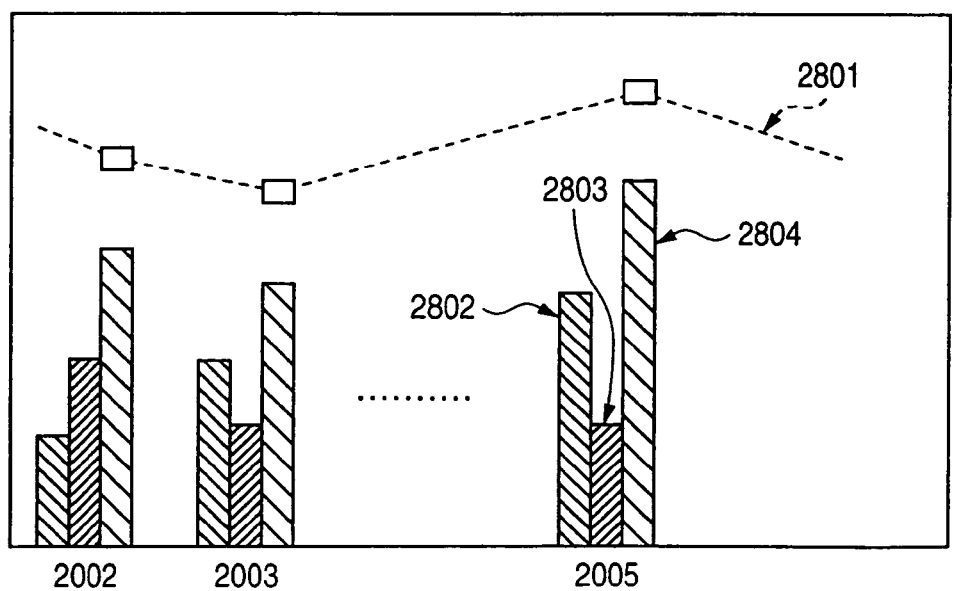
FIG. 28 is a diagram showing one example of transitions of business result index and cash flow in Embodiment 12 of this invention.

FIG. 28 shows one example of the business index values prepared by the business index calculating function unit 2601. In FIG. 28: numeral 2801 designates the transition of R.O.I. (Return ON Investment) as one example of the result index value; numeral 2802 the investment totalized for each year; numeral 2803 the business expense for each year; and numeral 2804 the business income for each year.

The R.I.O. (Return On Investment) is obtained from the following Formula 8, if the business income, the business expense and the investment for a fiscal year tare designated by C_IN(t), C_OUT(t) and I(t), respectively.

Formula 8:

$$R.I.O. = \sum_{t=1}^{T} (C\_IN(t) - C\_OUT(t)) \bigg/ \sum_{t=1}^{T} I(t)$$

Thus, the business index calculating function unit 2601 prepares the business index of the planning term from the market prediction data 2602 and the administration plan which is made by the optimum solution calculating function unit 106. Therefore, the administration plan made can be evaluated not only from the viewpoint of the investment effect but also in relation to the various cash flows in the enterprise administration, thereby to provide an effect that the administration plan can be made in flexible response to the changes in the enterprise result and the market.

Figures 29, 30A, 30B:
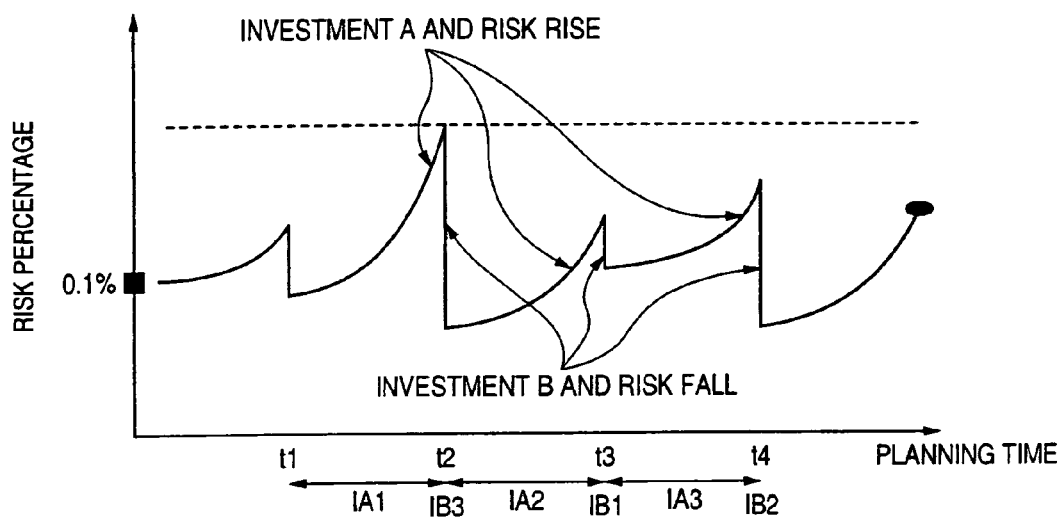
FIG. 29 is a diagram showing one example of time changes of risk percentages in Embodiment 13 of this invention.

Embodiment 13:

The system construction of Embodiment 13 of the invention is identical to that (of FIG. 1) of the foregoing Embodiment 1. FIG. 29 shows the time changes of the risk percentage of the case, in which the investment item is combined with two kinds of investments, i.e., the investment A (e.g., - -) defining a relation to the rise of the risk percentage for the continuation of an investment, and the investment B (e.g., - -) defining a relation to the fall of the risk percentage before and after an investment. The individual relations of the investment A and the investment B of FIG. 29 to the risk percentage are tabulated in FIG. 30.

In FIG. 30, the investment A is defined in relation to the rise of the risk percentage in FIG. 30A. The investment B is defined in relation to the fall of the risk percentage in FIG. 30B. In FIG. 30, the investment A and the investment B are classified at three stages into a level 1 (low), a level 2 (medium) and a level 3 (high), and the rise and fall is defined at each level in the table format. However, it is arbitrary to use a method for calculating the values of rise and fall functionally from the investment levels.

The functions and actions of Embodiment 13 will be described in the following. The optimum solution calculating function unit 106 (of FIG. 1) uses the following evaluation function f and searches the solution to minimize the evaluation function f with the following Formula 9.

Formula 9:
$$f = \sum_N \sum_T IAmn + \sum_N \sum_T IBmn + \sum_N \sum_T Rmn$$

Here in Formula 9: IAmn designates the investment A in the item m for the term n; IBmn designates the investment B in the item m for the term n; Rmn the risk on the item m for the term n; N the investment item; and T the plan term.

FIG. 29 shows the change of the risk percentage against the combinations (IA1, IB3, IA2, IB1, IA3 and IB2) of investments. Due to the difference among investment levels of the investment A, the rises of the risk percentage are different for the individual terms t1-t2, t2-t3 and t3-t4. Due to the difference among investment levels of the investment B, moreover, the falls of the risk percentage are difference for the times t2, t3 and t4.

The sum of the investments is the total of the expenses IA1, IA2 and IA3 invested continuously for the terms t1-t2, t2-t3 and t3-t4 and the expenses IB3, IB1 and IB2 invested at the times t2, t3 and t4 and is calculated by the following Formula 10.

Investment Sum=$IA1 \times (t2-t1) + IB3 + IA2 \times (t3-t2) + IB1 + IA3 \times (t4-t3) + IB2$   Formula 10

The risk calculating function unit 107 (of FIG. 1) calculates the risk Rmn from a risk percentage Rr(t) for the term and an influence Re(t) at the risk time by the following Formula 11.

$Rmn = Rr(t) \times Re(t)$.   Formula 11

The influence Re(t) of the risk is generally different depending upon the occurring time, although it is treated as a constant no matter what time of the planning term the risk might occur at. In the case of the power plant, for example, the risk is calculated by using the power of electricity planned at the time of the risk occurrence, as the risk influence.

Thus, the investment is composed of the investment (i.e., the investment A), defining the relation to the rise of the risk percentage for the continuation of the investment, and the investment (i.e., the investment B) defining a relation to the fall of the risk percentage before and after the investment, and the optimizing function calculates the combination of the investment to minimize the sum of the total investment and the total risk for the planning term, from those two kinds of investment combination. Therefore, the rising and falling patterns of the risk percentage can be evaluated in various combinations of investments.

Embodiment 14

The system construction of Embodiment 14 of the invention is identical to that (of FIG. 15) of the foregoing Embodiment 6. The functions and actions of Embodiment 14 will be described in the following.

The constraint checking function unit 1503 (of FIG. 15) calculates the constraints on the investment, such as the lower limit to the investment, the upper limit to the investment and sums g1 and g2 of the current investment from the following Formula 12 and Formula 13. The function unit 1503 further calculates the constraints on the risk, such as the lower limit to the risk, the upper limit to the risk and sums g3 and g4 of the current risk from the following Formula 14 and Formula 15.

Formula 12:
$$g1 = I^l - \sum_N \sum_T Imn$$

Formula 13:
$$g2 = \sum_N \sum_T Imn - I^u$$

Formula 14:
$$g3 = R^l - \sum_N \sum_T Rmn$$

Formula 15:
$$g4 = \sum_N \sum_T Rmn - R^u$$

In Formulas 12 to 15: $I^l$ designates the lower limit to the investment; Imn the investment in the item m for the term n; N the investment item; T the plan term; $I^u$ the upper limit to the investment; $R^l$ the lower limit to the risk; Rmn the investment in the item m for the term n; and $R^u$ the upper limit to the risk.

In the case of g1, g2, g3 and g4 $\leq 0$, the constraining conditions are satisfied so that the expense against the constraint is not added. In the case of g1, g2, g3 and g4>0, the calculated results of the foregoing Formulas g1, g2, g3 and g4 are the expense against the constraint so that the optimum solution is searched by the following Formula 16 using the following evaluation function f.

Formula 16:
$$f = \sum_N \sum_T Imn + \sum_N \sum_T Rmn + \sum Ci \times gi^2$$

In Formula 16: N designates the investment item; T the plan term; Imn the investment in the item m for the term n; Rmn the risk on the item m for the term n; and Ci a standard value for the expense for the violation against each constraining condition. This value is used as the coefficient when the square sum of the differences is obtained from the limit values calculated in g1, g2, g3 and g4.

Thus, the optimizing function calculates the expense for the violation against the constraint on the basis of the difference from the upper limit or the lower limit determined in the constraint, in case the constraint on the investment or the constraint on the risk is not sufficed. In case the total number of combinations of the investments to be handled in the administration plan and the constraining conditions increase, therefore, the optimum solution can be efficiently searched. Even in the case of the same number of violating constraining conditions, moreover, the superiority of the combination of the individual investments can be judged from the difference in the expense for the violation of the constraint.

Embodiment 15

The system construction of Embodiment 15 of the invention is identical to that (of FIG. 1) of the foregoing Embodiment 1. The functions and actions of Embodiment 15 will be described in the following.

The optimum solution calculating function unit 1502 calculates an optimum solution by setting the combination of investments to be evaluated at first for starting the calculations, as an initial solution, and by repeating the selections of the solution having the minimum evaluation function of Formula 1, from the combination (of the neighborhood solutions) which has changed a portion of the current combination in the aforementioned calculating procedure shown in FIG. 5.

Figure 31:
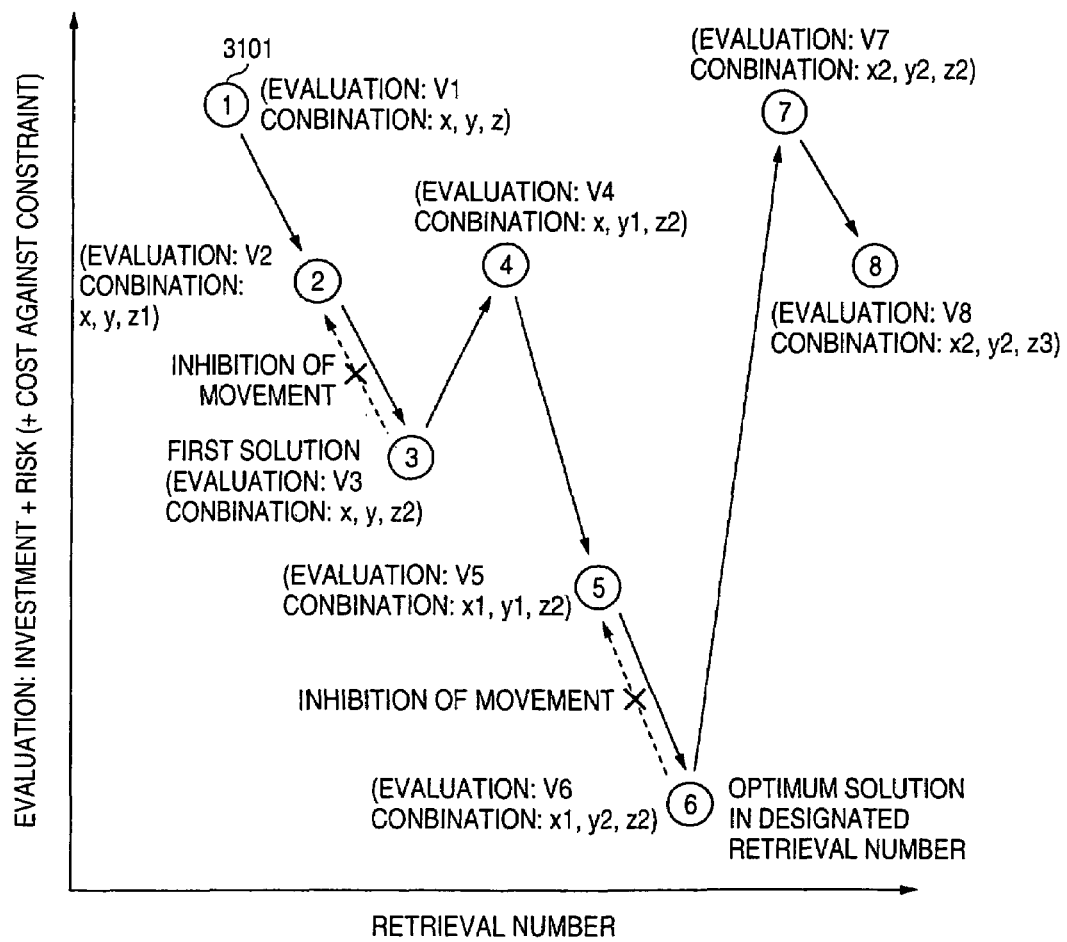
FIG. 31 is an explanatory diagram of solutions in Embodiment 13 of this invention.

FIG. 31 shows the changes in a solution 3101, which is selected in the course of solution searches by the optimum solution calculating function unit 1502, and in the evaluation. In FIG. 31, ①, ②, ③, ④, ⑤, ⑥, ⑦ and ⑧ designate Solution 1, Solution 2, Solution 3, Solution 4, Solution 5, Solution 6, Solution 7 and Solution 8, respectively. In Solution 1 ① to Solution 3 ③, the searches proceed in the direction (V1>V2>V3) for the evaluations to decrease. Solution 3 ③ is the case, in which a better solution than the current evaluation V3 is not present in the neighborhood, so that the searches cannot be continued if the decrease in the evaluation is used as the standard for selecting a next solution.

In the taboo searching method proposed by F. Glover in 1980's, even in case a solution does not have a better evaluation than that of the current solution, the search can be continued by selecting absolution having a good evaluation from the neighborhood. In the taboo searching method, the attributes (or variables changed in combination) accompanying the movement, if any, from one solution to another during the searches, are stored in a taboo list for a predetermined period. The solution to be next moved is determined by checking the information registered in the taboo list and the evaluation, so that the phenomenon, As might otherwise cause the repetitions of the movement of solutions by the operations of the same variable, can be prevented.

From the combination (X, Y, Z) of an initial solution to Solution 3 ③ in FIG. 31, the combination, as obtained by changing the value of a variable Z, is selected as a next solution so that the updating history of the variable Z is recorded in the taboo list. In the change from Solution 3 ③ to Solution 4 ④, the next solution is selected by changing the value of the variable other than Z on the basis of the registered contents of the taboo list. In the movement from Solution 6 ⑥ to Solution 7 ⑦, too, the next solution is selected by changing the value of the variable other than Y. During the searches, the movement to a next solution (e.g., the movement from Solution 3 ③ to Solution 2 ②) is inhibited by changing the variables registered in the taboo list. In case a solution to move next from Solution 3 ③ is selected, therefore, Solution 2 ② is not selected even if its evaluation is found better by comparing Solution 2 ② and Solution 4 ④, but Solution 4 ④ having a next better evaluation but not inhibited from movement is selected.

Thus, the optimizing function is provided with the function to calculate the combination for the investment that minimizes the total expense by using the taboo searching method. Even in case the sum of combinations for investments to be treated in the administration plan increases so exponentially that all the combinations cannot be evaluated within a designated period, therefore, the search range containing the combination having a good evaluation (or a small total expense) can be evaluated in a concentrated manner.

What is claimed is:

1. An administration planning system for preparing an administration plan for operating and maintaining a facility producing goods or services, using a computer, the administration planning system comprising:

an inputting function inputting a planning term and plural investment items operating in a facility producing goods or services, and inputting investment levels, related to inspection and maintenance of each of the investment items, for each of the investment items for the planning term;

a risk calculating function calculating failure risk levels for each of the investment items based on a correlation between the investment level for each of the investment items and a failure risk percentage corresponding to the investment level;

an optimizing function preparing the administration plan, the administration plan including optimized investment levels and optimized failure risk levels by optimizing and adjusting distributions of the investment levels of the investment items and of the failure risk levels calculated by the failure risk calculating function for the planning term, wherein the optimizing function repeats, n times, an optimizing step including calculating neighborhood solutions for an initial solution set by a first optimum solution to minimize the sum of total investment of the investment levels and total failure risk of the failure risk levels, and selecting a second optimum solution from a group comprising the initial solution and the neighborhood solutions to minimize the sum of the total investment and the total failure risk, wherein the optimizing function prepares the administration plan, based on the second optimum solution selected in the nth repetition of the optimizing step; and an outputting function outputting the optimized investment level and the optimized failure risk level for each of the investment items based on the administration plan prepared by the optimizing function.

2. The administration planning system according to claim 1, wherein each of the investment items is divided into an upper hierarchy and a lower hierarchy, and the optimizing function prepares the administration plan to have an upper administration plan including upper optimized investment levels and upper optimized failure risk levels corresponding to each investment item of the upper hierarchy, and a lower administration plan including lower optimized investment levels and lower optimized failure risk levels corresponding to each investment item of the lower hierarchy, and the upper administration plan is used as a constraining condition in the optimizing function for preparing the lower administration plan.

3. The administration planning system according to claim 1, wherein each of the investment items is divided into an upper hierarchy and a lower hierarchy, and the failure risk percentage in each investment item of the upper hierarchy is calculated by using the risk failure percentage in each investment item of the lower hierarchy.

4. The administration planning system according to claim 3, wherein, in construction of the upper hierarchy and the lower hierarchy, each of the investment items in each of the upper and lower hierarchies is represented as a block diagram and respective optimized failure risk levels are outputted by the outputting function.

5. The administration planning system according to claim 1, wherein individual data of past investment level and the failure risk percentage corresponding to each investment item are inputted by the inputting function, and correlation between the past investment level and the past failure risk percentage is calculated statistically.

6. The administration planning system according to claim 1, wherein the distribution of the investment levels and the failure risk levels is optimized and adjusted to prepare the administration plan by constraining at least one of the investment levels and the failure risk levels, arbitrarily.

7. The administration planning system according to claim 1, wherein the administration plan is prepared by weighting at least one of the investment levels and the failure risk levels for each of the investment items, and by optimizing and adjusting the distribution of the investment levels and the failure risk levels by the weighting.

8. The administration planning system according to claim 1, further comprising a retrieving function retrieving a past administration plan example similar to a combination of the investment items and the planning term, wherein the administration plan is prepared by bringing the distribution of the investment levels and the failure risk levels of the past administration plan example into an initial state and by optimizing and adjusting a combination of the distribution of the investment levels and the failure risk levels from the initial state.

9. The administration planning system according to claim 1, wherein the calculating procedure for optimizing the distribution of the investment levels and of the failure risk levels by the optimizing function is outputted by the outputting function.

10. The administration planning system according to claim 1, wherein correlation between the investment level and the failure risk level is diagrammed and outputted by the outputting function.

11. The administration planning system according to claim 1, further comprising:

an acquisition function for acquiring data at a predetermined period from a data managing system and for storing at least data of the failure risk percentage;

an extracting function extracting the administration plan, which has to be re-calculated, automatically if the data of the failure risk percentage are altered;

an executive function preparing the optimum administration plan based on the value of the data of the failure risk percentage altered with respect to the administration plan extracted; and a supplying function supplying a detailed cost management system for calculating investment costs when a total expense is given, with automatically altered data when the investment obtained as the optimum solution of the administration plan is altered.

12. The administration planning system according to claim 1, further comprising a result index calculating function calculating business index data for the planning term depending on at least market prediction data constructed of business income, busines expenses, and the investment levels of the administration plan prepared by the optimizing function.

13. The administration planning system according to claim 1, wherein a first investment level, defining relationship of a rise of the failure risk percentage for continuation of each investment, and a second investment level, defining a relationship to a fall of the failure risk percentage, before and after each of investments, are inputted to each of investment items, and the optimizing function includes a calculation function calculating optimized combination levels to minimize the sum of an investment sum and a failure risk sum for the planning term, from combinations of the first investment level and the second investment level.

14. The administration planning system according to claim 6, wherein the optimizing function includes a calculation function calculating an expense against a constraint based on a difference from an upper limit and a lower limit determined by the constraining, when at least one of constraint of the investment level and constraint of the failure risk level is not satisfied.

15. The administration planning system according to claim 1, wherein the optimizing function includes a calculation function calculating a combination of investment levels for minimizing total expense, by using the taboo searching method.

* * * * *